United States Patent [19]
Mani

[11] Patent Number: 6,017,433
[45] Date of Patent: Jan. 25, 2000

[54] DESALTING AQUEOUS STREAMS VIA FILLED CELL ELECTRODIALYSIS

[75] Inventor: Krishnamurity Nagasubramanian Mani, Basking Ridge, N.J.

[73] Assignee: Archer Daniels Midland Company, Decatur, Ill.

[21] Appl. No.: 08/968,284

[22] Filed: Nov. 12, 1997

[51] Int. Cl.$^7$ .................................................. B01D 61/44
[52] U.S. Cl. .................. 204/524; 204/529; 204/530; 204/542; 205/697
[58] Field of Search .................... 204/524, 529, 204/530, 542; 205/697; 426/239, 492, 48

[56] References Cited

U.S. PATENT DOCUMENTS

| | | | |
|---|---|---|---|
| 3,290,173 | 12/1966 | Marino | 127/63 |
| 4,492,601 | 1/1985 | Nakasone et al. | 127/48 |
| 5,593,563 | 1/1997 | Denoncourt et al. | 204/524 |
| 5,679,228 | 10/1997 | Batchelder et al. | 204/524 |
| 5,679,229 | 10/1997 | Goldstein et al. | 204/524 |
| 5,814,197 | 9/1998 | Batchelder et al. | 204/524 |
| 5,858,191 | 1/1999 | DiMasco et al. | 204/524 |
| 5,868,915 | 2/1999 | Ganzi et al. | 204/524 |

FOREIGN PATENT DOCUMENTS

| 1239776 | 7/1971 | United Kingdom | 426/239 |
|---|---|---|---|

*Primary Examiner*—Kathryn Gorgos
*Assistant Examiner*—Thomas H. Parsons
*Attorney, Agent, or Firm*—J. Warren Whitesel; Laff, Whitesel & Saret,Ltd.

[57] ABSTRACT

The invention is a process for desalting aqueous solutions, which are initially acidified to a pH of about 3 or less. Then, the acidified solution is fed into a desalting compartment of an electrodeionization cell which contains a suitable ion exchange material and is isolated from an adjacent concentrating compartments by an anion and a cation exchange membrane. The concentrate compartment contains a netting or another suitable material that promotes turbulence in a flowing feed stream. Water is supplied to the concentrate compartment. A DC current passes through the electrodeionization cell to produce a substantial desalination of the feed solution. A less acidic desalted solution and a concentrate waste solution are withdrawn from the electrodeionization cell.

26 Claims, 10 Drawing Sheets

EDI PROCESS FOR HFCS DESALTING

DESALTING AQUEOUS STREAMS VIA FILLED CELL ELECTRODIALYSIS

This invention relates to processes for desalting aqueous streams by using an electrodialysis cell wherein the dilute or ion depleting compartments contain a suitable ion exchange material and more particularly to processes wherein the stream to be desalted is acidified and processed in the electrodialysis cell or in a combination of cells in order to achieve the requisite level of desalting.

A concentrate feed stream containing the transported species and acidity is optionally processed in one or more downstream steps that may include a pH adjustment/filtration, nanofiltration, conventional electrodialysis or diffusion dialysis, in order to recover the species for possible reuse. The process is particularly applicable to the desalting of streams containing sugar.

BACKGROUND OF THE INVENTION

Filled cell electrodialysis, also called electrodeionization ("EDI"), is a recognized means for achieving high levels of desalination of water. The process involves an incorporation of an ion exchange material (such as an ion exchange resin), in an aqueous feed (or an ion depletion) compartment formed in a gasket positioned between anion and cation exchange membranes. The aqueous feed stream that needs to be desalted flows in the ion depletion compartment.

A secondary aqueous stream is circulated in the adjacent concentration compartments. Under a direct current driving force, the ions in the feed stream are transported from the ion depletion to the concentration compartments. The process is similar to conventional electrodialysis, except that the use of ion exchange material in the ion depletion compartment provides an increased electrical conductivity and facilitates higher levels of desalination, with a higher overall current efficiency. The EDI process is particularly well suited for desalting aqueous solutions of low to moderate ion content.

The EDI apparatus and its applicability to obtaining high purity water are detailed in a number of U. S. patents, such as: U.S. Pat. Nos. 4,066,375; 4,203,976; 4,243,976; 4,249,422; 4,465,573; 4,632,745; 4,727,929; 4,871,431; 4,925,541; 4,931,160; 4,956,071; 4,969,983; 5,066,375; 5,116,509; 5,154,809; 5,120,416; 5,203,976; 5,292,422; 5,308,466; 5,316,637 and 5,503,729.

Also, a related disclosure is found in my two recently filed U.S. patent applications Ser. No. 08/784,050 and Ser. No. 08/785,648, both filed Jan. 17, 1997 (pending). The gaskets or chambers and apparatuses used in the EDI units disclosed in these patents and applications have a variety of designs.

The major application for EDI to date has been in the production of high purity water from suitably pre-purified softened aqueous feed streams having a relatively low initial salt content and electrical conductivity. Specific documents that describe the current state of the art are:

Ganzi, G. C.; "Electrodeionization for High Purity Water Production", in a paper presented at the 1987 AIChE Summer National Meeting, August 1987;

Ganzi, G. C. et al, "High Purity Water by Electrodeionization: Performance of the Ionpure® Continuous Deionization System, Ultrapure Water," 4(3), April 1987.

Ganzi, G. C., et al, "Production of Pharmaceutical Grades of Water using Ionpure Continuous Deionization Post-Reverse Osmosis", in a paper presented at the ICOM meeting, Chicago, Ill., 1990

Ganzi, G. C., et al, "Water Purification and Recycling using the Ionpure CDI Process", presented at the AIChE Summer National Meeting, Pittsburgh, Pa., August 1991

Hernon, B. P., et al, "Progress Report: Application of Electrodeionization in Ultrapure Water Production", in a paper presented at the 56 Annual Meeting International Water Conference, Pittsburgh, Pa., October 1995.

Allison, R. P., "The Continuous Electrodeionization Process", in a paper presented at the American Desalting Association 1996 Biennial Conference & Exposition, Monterey, Calif., August 1996.

The EDI process can be visualized as occurring in two regimes, depending upon the ionic content of the aqueous feed to be desalted and certain operational parameters such as flow rate, current input etc. At higher ionic concentrations and when operating below a limiting current density, the process operates somewhat as the conventional electrodialysis process operates.

In this first regime (herein termed "Regime I"), the ion exchange material in the feed stream or ion depleting compartments primarily increases the electrical conductivity of the feed stream or the ion depleting loop, thereby facilitating significant levels of de-ionization. The presence of ion exchange material in the feed loop lowers the electrical resistance for ion transport, thereby allowing significantly higher levels of de-ionization in the EDI than would be feasible via conventional electrodialysis.

Often, the ion exchange material is a mixture of cation and anion exchange resins in the feed stream (or ion depletion) compartment. This material greatly facilitates the transport of the cations and anions in the feed solution to the surfaces of the cation and anion exchange membranes, respectively. As a result, the overall electrical conductivity in the feed loop increases, resulting in an increased current transport for a given applied voltage. At the same time, the current efficiency—the ratio of the equivalents of ions transported per faraday of current input—for the EDI process also remains high; usually >0.5. The extent of water splitting is quite small, even when the conductivity of the desalted feed is in the range of 10 to <1 $\mu$S/cm.

In principle, conventional electrodialysis (i.e., without the use of ion exchange material in the feed loop) can operate in this regime. However, this operation has been deemed unsuitable from an economic standpoint because of the low current throughput (i.e. because of the poor conductivity in the depleted feed loop) and the large membrane areas that are required which leads to a high capital cost.

A limiting current density is reached in EDI when sufficient amounts of ions are not available in the resin and membrane boundary layers for current transport, even at lower ion concentrations, as compared to concentrations in conventional electrodialysis. In this mode of operation (herein termed "Regime II"), the application of electrical current results in the dissociation or splitting of water molecules into hydrogen ($H^+$) and hydroxyl ($OH^-$) ions. At least in part, these ions displace the ions present in the ion exchange resin, in effect regenerating the resin material. The displaced ions are transported out of the feed loop, across the ion exchange membranes and into the concentrate loop, thus producing highly desalted water. It is in this regime (termed "Regime II"), that the EDI process has found the major commercial use, i.e., production of high purity water with a conductivity of 0.055–0.5 $\mu$S/cm or a resistivity of 2–18×10$^6$ ohm cm (2–18 Meg-ohm).

An adequate pretreatment of the feed water is an essential pre-requisite to the reliable long term operation of the EDI unit. The presence of insoluble matter and certain organic foulants in the feed stream may cause a plugging of the cell internals, or an irreversible fouling of the ion exchange material in the feed loop or the ion exchange membranes.

Therefore, these insoluble matters and organic foulants must be removed via upstream pretreatment steps.

A further problem in EDI operation is the precipitation of calcium and magnesium ions within the EDI cell due to their poor solubility in the environments found within such cells. An addition of an acid, such as hydrochloric, to control the precipitation of the divalent ions is practiced at times in conventional electrodialysis. However, to date, the addition of such acid has not been used in EDI for producing desalted streams, possibly because the problems associated with the water splitting and the attendant pH shifts could pose serious impediments to a reliable operation of the EDI unit. Also, the addition of acid and its subsequent removal imposes additional reagent costs, as well as the downstream operating costs.

For these reasons, softening of the feed stream is used to remove the calcium and magnesium ions from the feed solutions. However, this pre-treatment process also has some costs and associated process complexities. The softening process is carried out in a column containing a cation exchange resin. When the column is sufficiently loaded with the multivalent cations, it is regenerated by the use of a concentrated salt solution (NaCl) or, by using an acid and a base (usually HCl and NaOH). Either method produces additional waste streams that need to be removed. The softening process often requires a pH adjustment of the feed stream to neutral or alkaline(pH$\geq$7) in order to facilitate the removal of calcium and magnesium ions. Furthermore, the softening process replaces the calcium and magnesium values in the feed stream with sodium. In turn, the sodium must be removed via the EDI process.

In many commercial operations, the softened feed stream is subjected to an additional reverse osmosis ("RO") step to further reduce the ion load to the EDI cell stack. In other instances, an RO unit having a high level of rejection of ions (say >98%) may be deployed. If such a unit is used, a separate upstream softening step may be unnecessary. However, this step may result in the production of a substantial volume of a "reject" stream that represents a loss of feed material. Such RO treated feeds to the EDI have a conductivity in the range of only about 5–80 $\mu$S/cm. Consequently, the EDI unit operates substantially in the water splitting regime (Regime II).

An improved desalination process is needed that is applicable to streams of low to moderate ion content. One desired process does not require upstream softening or reverse osmosis ("RO") steps with their added costs, attendant process complexities, additional waste generation, and potential yield losses. Improved processes that allow inexpensive, preferably on-site, production of the needed acid for adding to the EDI feed, as well as means for recovering/reusing such acid are also needed.

Particularly, in the production of dextrose and other fermentation products, a number of process applications require high levels of ion removal from aqueous streams. Such feed streams often contain significant levels of calcium and/or magnesium, as well as ions such as sodium, chloride, sulfate, bisulfite, etc. These streams have a relatively high sugar content and density, which in turn increases their viscosity and or osmotic pressure while suppressing their electrical conductivity. A concentrated dextrose solution derived from the hydrolysis of corn starch might, for example, contain 40 ppm calcium, 30 ppm magnesium, ~100 ppm sodium, and equivalent amounts of anions such as chloride, sulfate etc., impurities such as organic compounds and color bodies; and might have a conductivity of ~400 $\mu$S/cm. Similarly, concentrated high fructose syrup solutions obtained from an enzymatic conversion of purified dextrose might contain ~45 ppm magnesium (added as a catalyst to assist in the enzymatic conversion operation), 1–10 ppm calcium, ~100 ppm sodium, equivalent amounts of anions such as chloride, sulfate etc., as well as small quantities of organic acids and have a conductivity of 300–400 $\mu$S/cm.

It can be seen that the hardness component of these feed streams is a significant portion of the total ionic load. Therefore, the prior art processes involving softening a feed stream requires a relatively large softening column in front of the EDI cell. Such a two step approach (feed softening+ EDI) is expensive and offers no significant improvement over the ion exchange method described below.

It turns out that the desalting of process feed streams, such as dextrose solutions, pose other problems that further negates the economic viability of an upstream softening step. These and other sugar containing solutions are prone to bacterial growth problems and have stability problems at nearly neutral or alkaline pH's.

In order to minimize such contamination problems, the solutions are intentionally acidified. While any acid (such as sulfuric or hydrochloric) may be used to acidify the sugar solutions, the one most commonly used is sulfur dioxide, partly because it has bactericidal properties. In addition, being a weak acid, sulfur dioxide is able to provide a good buffer in the pH range of 2–3 where the sugars exhibit the best stability in solution. About 200–1000 ppm of sulfur dioxide is added during the processing of dextrose and fructose streams. In order to obtain products of satisfactory quality, these streams need to be pre-treated to remove both color and odor, and subsequently to be desalted to provide a final product conductivity of ~3 $\mu$S/cm. Softening such streams prior to EDI is not feasible since this would require an unacceptable upstream pH adjustment step.

At present these sugar solutions are purified by an initial carbon treatment step, followed by a multiple step ion exchange involving alternating cation and anion exchange columns; (see "Diaion® Manual of Ion Exchange Resins," Volume II, Pages 93–107; by Mitsubishi Kasei Corp., March 1992; Second Printing May 1, 1993). Such exchange columns consume large quantities of acid and alkali (HCl, NH$_3$/NaOH) for regeneration, as well as de-ionized water for sugar displacement and rinsing the ion exchange beds. Consequently, the ion exchange route generates large quantities of waste streams that need to be treated and eliminated.

Additionally, the ion exchange process results in some dilution of the original syrup solutions. Substantial amounts of energy and capital have to be expended for re-concentrating the streams. The ion exchange beds used in the desalting process are rather massive; therefore, aside from the required capital costs, one also has operating costs associated with the attrition losses of ion exchange resin. Accordingly, an improved desalting process that overcomes the shortcomings of the ion exchange process is needed.

An electrodeionization process as disclosed in prior art for water desalination/purification is not suitable for use with sugar containing solutions for a number of reasons:

The streams encountered in the commercial plants have a high sugar content, 40–60 wt %, and hence a high osmotic pressure. In effect, this rules out the use of an RO (reverse osmosis) pre-treatment process for removing the ions from such solutions. The RO process is inappropriate for this application since the desired product is desalted syrup and is not desalted water.

Softening the feed to the EDI unit, via an ion exchange, would require raising the pH of the sugar solution. This is not a viable option since it would exacerbate the bacterial contamination problem. An additional factor is that sugar solutions are unstable in alkaline conditions.

The high levels of the divalent ions in relation to the total ion load, coupled with the large stream flows encountered in commercial plants would make an upstream softening step expensive and impractical.

For these reasons, an improved process is needed for purifying such biologically sensitive streams. A process for directly desalting such acidic streams is highly desired.

Also needed are methods for recovering valuable components in the concentrate stream for possible recycle/reuse. In an EDI unit, as with most membrane based processes, a small portion of the component in the feed stream (e.g. sugars cited in the example in the earlier paragraph) would end up in the concentrate stream waste product. Means are needed for recovering such components, if they are valuable, or if their recovery offers substantial environmental benefits. Since magnesium is intentionally added to the high fructose syrup stream in the dextrose isomerization step, a method is needed to recover the magnesium for reuse.

SUMMARY OF THE INVENTION

In keeping within aspect of the invention, an improved desalting process has been devised for desalting aqueous streams without requiring an upstream softening step. In the process, the feed stream that is substantially free of suspended matter and high molecular 5 weight fouling species (e.g., organics) is acidified to a pH of 3 or thereabout and then processed in an EDI cell stack. The acidification of the feed stream may be achieved via a direct addition of a recycled acid or with a fresh acid e.g. sulfuric, sulfurous or hydrochloric. Alternatively, the acidification of the feed stream may be achieved in a bipolar membrane electrodialysis cell via the splitting of a commercially available salt such as sodium chloride or sodium sulfate.

The EDI unit (termed herein the "primary unit") is operated substantially in the regime where the extent of water splitting is fairly low, in the order of 1–2% or less (Regime I). The feed stream solution which is to be desalted is preferably processed in a once-through manner.

The success of the improved process is based on a finding that, in the lower pH region, the calcium and magnesium ions are transported out of the feed loop, along with the sodium and hydrogen ions, without a fouling of the ion exchange resin or the membranes. In effect, the softening and desalting are achieved in a single step operation. The amount of acid added to the feed stream is such that when the target level of desalination is achieved, the product stream remains marginally acidic, namely a pH of <6.5; and preferably <5. The concentrate from the EDI unit should preferably be acidic (i.e. pH<7) or at a level where the transported divalent species do not precipitate inside the concentrate loop. A desalted product at a conductivity of 1–25 $\mu$S/cm, can readily be obtained via this process. The product contains little or no calcium or magnesium ions.

If desired, the product stream can be further desalted in a secondary EDI cell stack operating in a substantially water splitting mode (i.e., Regime II) to obtain a higher purity product with a conductivity of 0.055 to 1 $\mu$S/cm. Alternatively, the product from the primary EDI unit may be treated via a conventional ion exchange in order to obtain a higher purity product.

If the feed loop of the EDI unit is operated in a once-through manner, (i.e., without any internal or external fluid recycling), the entire desalting operation may be achieved in a single EDI cell stack, providing that a sufficient amount of acid has been added to ensure that the desalted product remains marginally acidic, namely a pH of <6.5; preferably <5. Once again, the pH of the concentrate product is preferably kept acidic.

The process of this invention is particularly well suited to the desalting of biologically sensitive streams such as sucrose, dextrose and high fructose sugar (HFS) solutions, produced from sugar cane/beets, or starch based materials obtained from grain (corn). In the production of dextrose or high fructose syrup, for example, the concentrated syrup intermediates contain ions such as calcium, magnesium, sodium, chloride and sulfate. Such feed streams can be effectively desalted by acidifying the feeds and desalting them in the EDI cells.

Water, or a portion of the feed stream, may be used in the concentrate loop of the EDI cells to pick up the transported salt ions and the acid values. In addition to the salts and the acid, the concentrate stream from the EDI cell stack contains small amounts of other components (such as sugars) if they are present in the feed stream. This pick-up stream may be disposed of after it has been neutralized with lime or another suitable alkali. Or, it may be forwarded to a secondary process that can directly utilize the valuable component(s), such as a utilization in ethanol production. Alternatively, its acid content may be recovered via a stripping operation (in the case of $SO_2$ which is volatile acid) or diffusion dialysis/electrodialysis and reused for acidifying the feed stream solution, while the residual solution which is at a near neutral pH may be discarded.

Another treatment option for the concentrate stream involves a nanofiltration step. In the sugar desalting, an application filtration using the nanofiltration membrane is able to remove much of the water and monovalent salts, such as NaCl, while substantially retaining sugars, as well as calcium and magnesium, from the concentrate product. A portion of the acid may also be retained by the nanofiltration membrane, if the acid should be of the multivalent type, such as sulfurous or sulfuric. This retentate may be recycled-upstream, as in the high fructose syrup production. Alternatively, if the hardness values are to be eliminated from the system, it can be achieved via a pH adjustment and filtration or by an ion exchange softening. The purified retentate can then be returned to the sugar recovery operation.

This invention provides a process for the electrodeionization (EDI) of salt containing solutions. This process involves the acidification of the salt containing stream prior to the EDI step. In the process, the salt cations and anions, as well as the ions from the added acid, are substantially completely removed in the EDI cell stack through the use of a direct current driving force. This EDI process is particularly useful in the desalting of sugar containing solutions such as those derived from the saccharification of starch to dextrose and high fructose syrup (HFS) solutions derived from the enzymatic conversion of the dextrose solution. The process can also be used for desalting hard water or other biologically sensitive solutions, such as those obtained from sugar cane and beet processing.

BRIEF DESCRIPTION OF DRAWINGS

The invention may be understood best from the following specification taken with the attached drawings, in which.

DETAILED DESCRIPTION OF THE INVENTION

Figure 1:
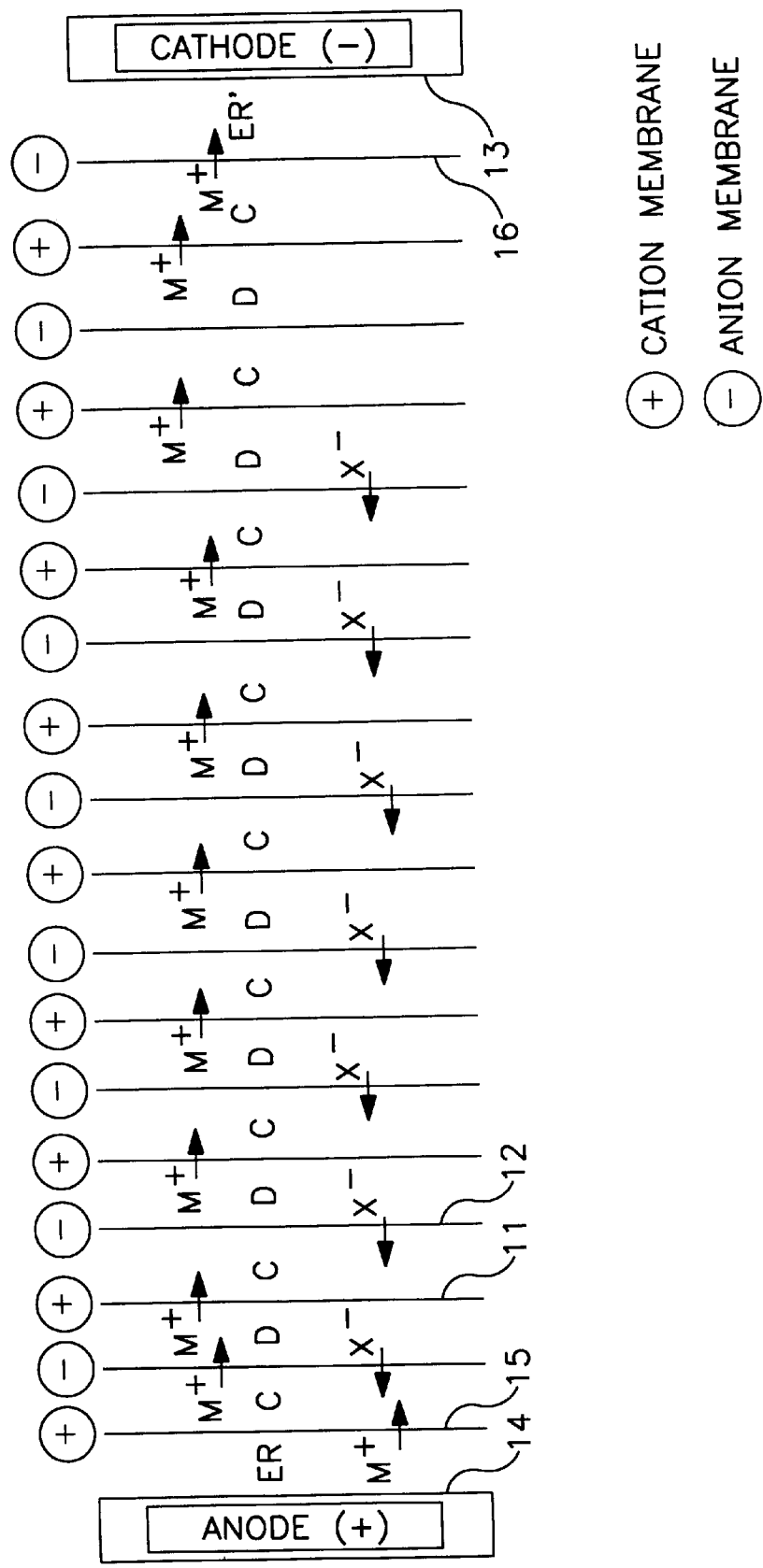
FIG. 1 schematically shows the arrangement of membranes in an EDI test cell.

FIG. 1 schematically shows the assembly of an electrodeionization cell stack. There are eight sets of feed (also called "dilute" or "ion" depleting) and concentration compartments separated by cation (+) and anion exchange (−) membranes, such as 11 and 12, respectively. The membranes are assembled between a single set of electrodes 13, 14 (FIG. 1). Commercially, as many as 50–200 such sets (called "cell pairs") may be assembled between a single set of electrodes.

The feed compartments, denoted by "D", are filled with a suitable ion exchange material. For desalting solutions which contain cations and anions in essentially equivalent amounts, a mixture of cation and anion exchange resin material is packed into the D compartments. The resin material that is used may be in the form of either an ion exchange felt/fabric or ion exchange resins in the bead form.

The concentrate compartments, denoted by "C", are usually filled with a suitable polymeric netting material that helps support the membranes as well as improve fluid distribution.

When a direct current is applied across the electrodes 13, 14, the cations in the feed stream, shown as $M^+$, move in a direction toward the cathode 13 and across the cation exchange membranes 11 to the concentrate compartments C. Simultaneously, the anions in the feed stream, shown as $X^-$, move in a direction toward the anode 14 and across the anion exchange membranes 12 to the concentrate compartments C. The net result is a removal of salt from the feed loop and its accumulation in the concentrate loop. The EDI process is similar to conventional electrodialysis. However, the inclusion of ion exchange resins in the dilute loop significantly improves the electrical conductivity and significantly enhances a de-ionization of the feed solution.

As shown in FIG. 1, the electrodes are located in compartments, ER and ER' that are preferably separated from the rest of the process compartments by a set of cation exchange membranes 15 and 16. Separate rinse streams are circulated therein. This separation of the rinse stream is desirable from the point of isolating the electrode loop byproducts such as $H_2$, $O_2$, and other oxidation products (such as chlorine) from the main EDI process. Another desirable feature shown in FIG. 1 is the use of concentration compartments adjacent to the electrode rinse loops. This use of concentration compartments further minimizes the intrusion of the oxidizing species into the feed compartments D containing the ion exchange resins.

Figures 2A, 2B:
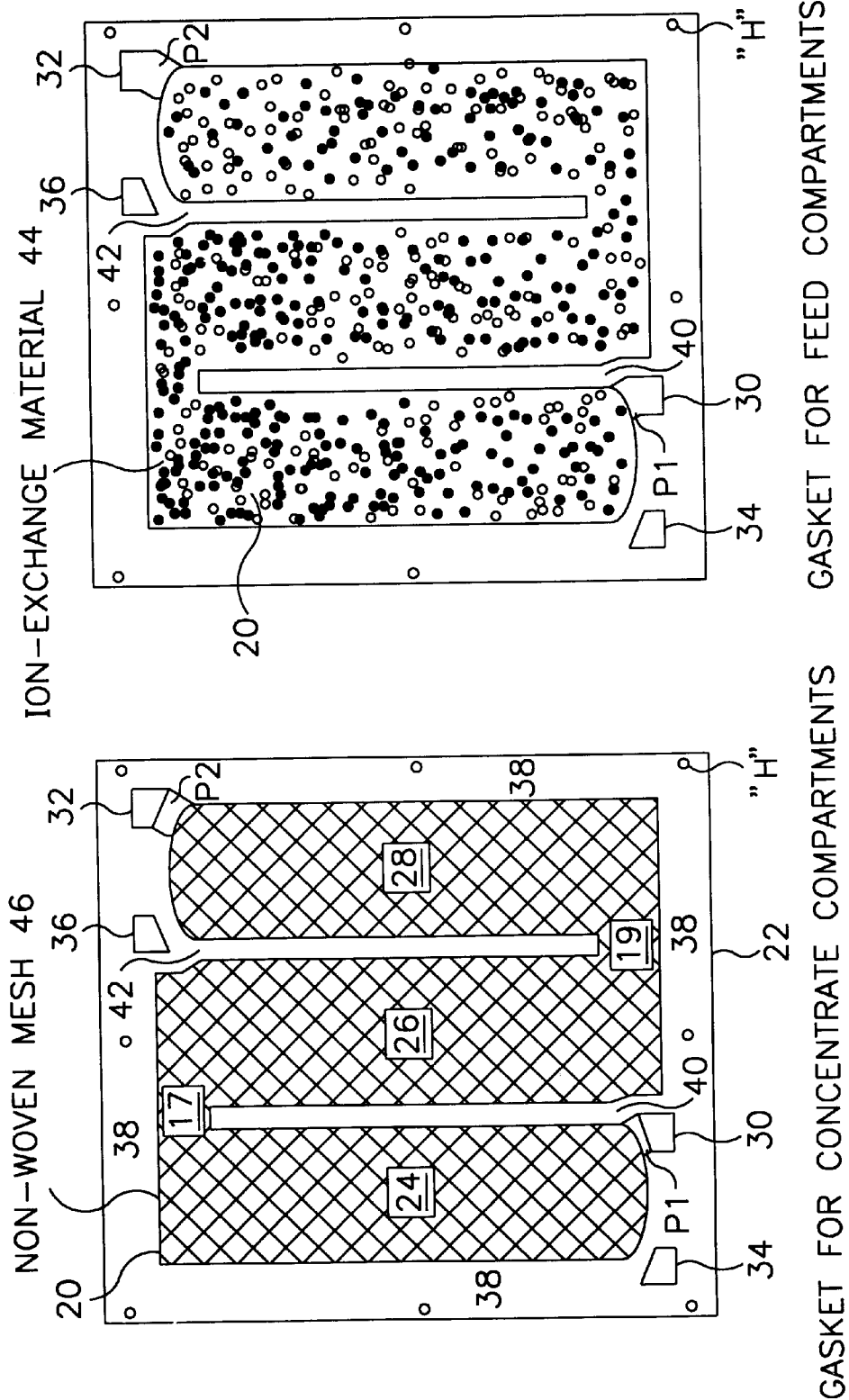
FIGS. 2(a), 2(b) are views showing the construction of EDI cell gaskets.

The gaskets used to form the feed and concentrate compartments can be of any type described in the previously cited references. A particular design which I have used in the processes of this invention is illustrated in FIGS. 2(a) and 2(b). A plurality of these gaskets are clamped together to form an aligned stack of gaskets, with each gasket being separated from its neighboring gasket by a membrane.

Each of the gaskets has a uniform thickness and is fabricated of a relatively soft polymeric material, such as polyethylene. Or, the gasket may be made from a composite comprising a slightly harder core, such as high density polyethylene/polypropylene, with soft top and bottom surfaces made of a material such as Kraton® rubber.

The central or active area 20 of the gasket is divided into a plurality of flow path sections 24, 26, 28 which are connected in series by restrictor sections 27, 29 in order to form a serpentine path between the inlet and outlet ports P1, P2, respectively. The eight "H" holes in the periphery of the gasket provide a means for aligning the various gaskets and membranes in the electrodeionization stack illustrated in FIG. 1 and for facilitating a clamping of the stack of gaskets together. Not all of these holes need be used in the construction of the stack.

The liquid feed stream enters and exits the stack of gaskets through two manifolds formed by aligned holes 30 and 32, for example. Two other manifold holes 34 and 36 in each gasket are aligned to provide the "piping" conduits for a second (concentrate) stream. Since the gaskets are of uniform thickness, there is a good mating and sealing of the gaskets against the adjacent ion exchange membranes.

The central area 20 of the gasket is contained by the gasket edges (such as 38). The intermediate support ribs 40, 42 define the feed (or desalting) compartment which contains the resin or other ion exchange material, shown at 44 in FIG. 2(b). A plastic netting material or other suitable turbulence promoter may fill the concentrating compartment, as shown in FIG. 2(a).

The ion exchange material in the central area 44 in FIG. 2(b) may be a cation or anion exchange resin or a mixture of the two resins. A mixture of cation and anion exchange resins is usually used for desalting streams which contain equivalent amounts of cations and anions. Alternatively, ion exchange material that has been fabricated into a mesh or mat can be used. Or, optionally, the ion exchange material may be contained within a tightly knit or suitably microporous cloth. If the resin's performance decreases over time, instead of having to discard the entire gasket/membrane assembly, these latter options contribute to the ease of both the original assembly and the resin removal and replacement. The use of a resin impregnated felt or cloth facilitates assembly and the subsequent refurbishment of the cell stack. The thickness of the compartment 44 containing the ion exchange material is preferably 1.5 to 5 mm. Thinner compartments may lead to an inadequate packing of the ion exchange material. Thicker compartments do not provide a significant process improvement and may result in higher electrical power consumption.

The gasket for the concentration compartment (FIG. 2(a)) is usually made thinner than the compartment containing the ion exchange material. Usually, a thickness of 0.5 to 3 mm is preferred and is preferably filled with a plastic netting (woven or preferably non-woven) having a large open area, because the solution flowing therein has a higher electrical conductivity. The thinner gasket affords a higher linear velocity at a given pumping rate, reduces polarization, and lowers electrical power consumption.

Ports P1, P2 enable the entry and exit of the solutions into and out of the gasket via the manifold holes 30, 32. If they are used in the feed compartments, the ports must have openings that are narrow enough to contain the ion exchange resins. Also, the ports should be able to provide an adequate seal against the adjacent ion exchange membranes. Suitable port designs are disclosed in my co-pending patent applications: Ser. No. 08/784,050 and Ser. No. 08/785,648, both filed Jan. 17, 1997. The feed solution enters the gasket via the port P1, traverses the serpentine area formed by the paths 24, 26, 28 and the restrictor sections 27, 29, and exits via the port P2.

Figure 3:
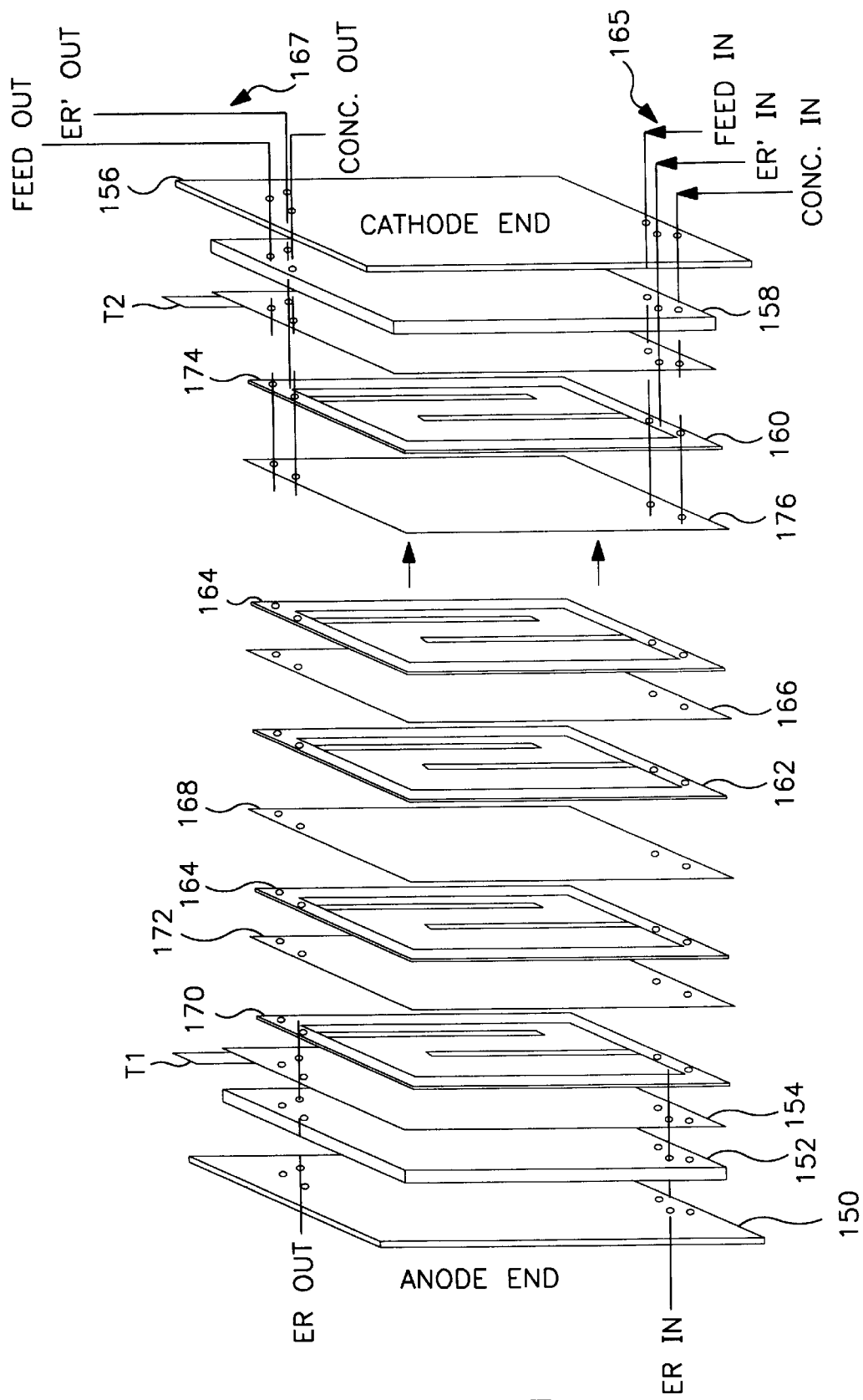
FIG. 3 is a perspective view of an EDI cell assembly.

FIG. 3 shows the construction of the EDI stack of gaskets, membranes, and electrodes used in the inventive process. The stack is assembled in a horizontal position by using a set of aligning pins (not shown). The entire assembly is then held together by a set of clamping bolts and nuts (not shown). The gaskets comprising the desalting compartments have a thickness of ~2.5 mm and are filled with the requisite amount of the ion exchange material. The gaskets used for the concentration compartments are thinner, ~1 mm. However, both sets of gaskets have an identical layout of the manifold holes 30, 32, 34 and 36 (FIG. 2) and ribs 40, 42 so that a fully assembled stack has manifolds, ribs, and gasket edges 38 that are properly aligned relative to each other in order to provide the requisite membrane support and sealing between the compartments and the adjoining membranes.

Starting at the anode end (the left side FIG. 3), the stack has a stainless steel plate 150 (0.375"–0.5" thick), a polypropylene end plate 152 (1" thick) and an anode electrode sheet 154 (0.062" thick), with rubber sealing gaskets (not shown) in between. The electrode 154 is a noble metal oxide coated on a titanium substrate. At the other end (right side) a similar assembly of a steel plate 156, a plastic end plate 158, and a cathode electrode sheet 160 is used. The cathode material is 316 stainless steel. The electrode sheets 154 and 160 have tabs T1, T2 for making electrical connections to an external DC power supply. The gaskets and membranes are assembled between the two electrodes. The desalting (D) and concentrating(C) compartments are contained within the gaskets 162 and 164, (see FIG. 1). The ion exchange membranes (e.g. cation membrane 166 and anion membrane 168) alternate within the cell assembly, as shown.

The desalting compartments D are packed with a mixture of anion and cation exchange material, while the concentrating compartments C contain a non-woven mesh material. The solutions both enter and exit the stack from the cathode end. Solutions are distributed to the individual chambers within the gaskets via the manifold holes in the gaskets and membranes. The location of the ports determines which gasket is being fed by a particular stream which is flowing through the manifold holes.

The solutions entering each gasket flow through the flow path 165 that is formed by the aligned manifold holes connected in series. In the arrangement shown, the flow of solutions in the D and C compartments is co-current. The solutions exiting the individual gaskets through the flow path 167 are channeled through the exit manifold and out of the electrodeionization stack assembly at the cathode end.

The electrode rinse solutions ER and ER' are fed through separate loops. Preferably the concentrate solution is circulated through the electrode rinse loops. The anode rinse solution or anolyte ER circulates through the anode gasket 170 and is separated from the adjacent concentrate loop by a cation membrane 172, which may or may not be the same type as the other cation membranes 166 that are used in the stack. The cathode rinse solution or catholyte ER' circulates through the cathode gasket 174 and is isolated from the adjacent concentrate stream by a cation membrane 176 which may or may not be of the same type as the other cation membranes 166, 172 used in the stack.

The gasket design shown in FIG. 2(a) can be used by itself, in constructing conventional electrodialysis (ED) apparatus. This is disclosed in my prior application Ser. No. 08/784,050, filed Jan. 17, 1997 (pending). Construction of such an apparatus is essentially identical to that for the EDI shown herein by FIGS. 1 and 3. The difference is that the desalting compartments are not filled with the ion-exchange material. Additionally, to minimize electrical consumption, the feed and concentration compartments are both of the same thickness, ~1 mm.

The desalting process of this invention was demonstrated using a high fructose corn syrup solution ("HFCS") containing ~50% total dissolved solids; comprising ~42 wt % fructose and ~58% dextrose. The HFCS is obtained via isomerization (enzyme catalyzed conversion) of a purified dextrose solution. The isomerization process requires the addition of small quantities of a magnesium salt, typically magnesium sulfate to the dextrose feed. Small amounts of chloride and sodium are also introduced, the chloride being from the enzyme feed and the sodium being from a pH adjustment step. As a result the product HFCS contains various cations and anions, such as ~35–45 ppm Mg, ~100 ppm Na, ~150 ppm sulfate, and ~150–200 ppm chloride.

The HFCS from the enzymatic conversion step is carefully filtered to remove the enzymes and other insoluble matter. The filtered syrup solution is then acidified and passed through a carbon bed to remove high molecular weight organics and coloring matter. The acidification step helps maintain the stability of sugars as well as minimizes or eliminates bacterial contamination and growth problems in the carbon bed. Removal of color bodies by the carbon bed is also apparently enhanced by the acidification step.

In principle, any acid can be used; however, sulfur dioxide is currently thought to be the best choice, because of its bactericidal properties, and its ability to buffer the pH in the 2–3 range, wherein the sugar solutions exhibit the most stability. The required acid may be added purely as a purchased material; or, it may be produced on site via the bipolar membrane based electrodialysis process. The use of the bipolar membrane based process for producing acids and bases from their salts is known (e.g. K. N. Mani, "Electrodialysis Water Splitting Technology", J. Membrane Science, 58,(1991) 117–138). Sodium bisulfite or sulfite, for example, can be used to generate sulfur dioxide on site.

In addition to the cations and anions mentioned above, the acidified, carbon treated solution may contain, 200 to 1000 ppm of sulfur dioxide. The conductivity of the solution is in the order of 300–400 $\mu$S/cm. A target conductivity for the desalted syrup is ~3 $\mu$S/cm, representing a >99% de-ionization.

Figure 4:
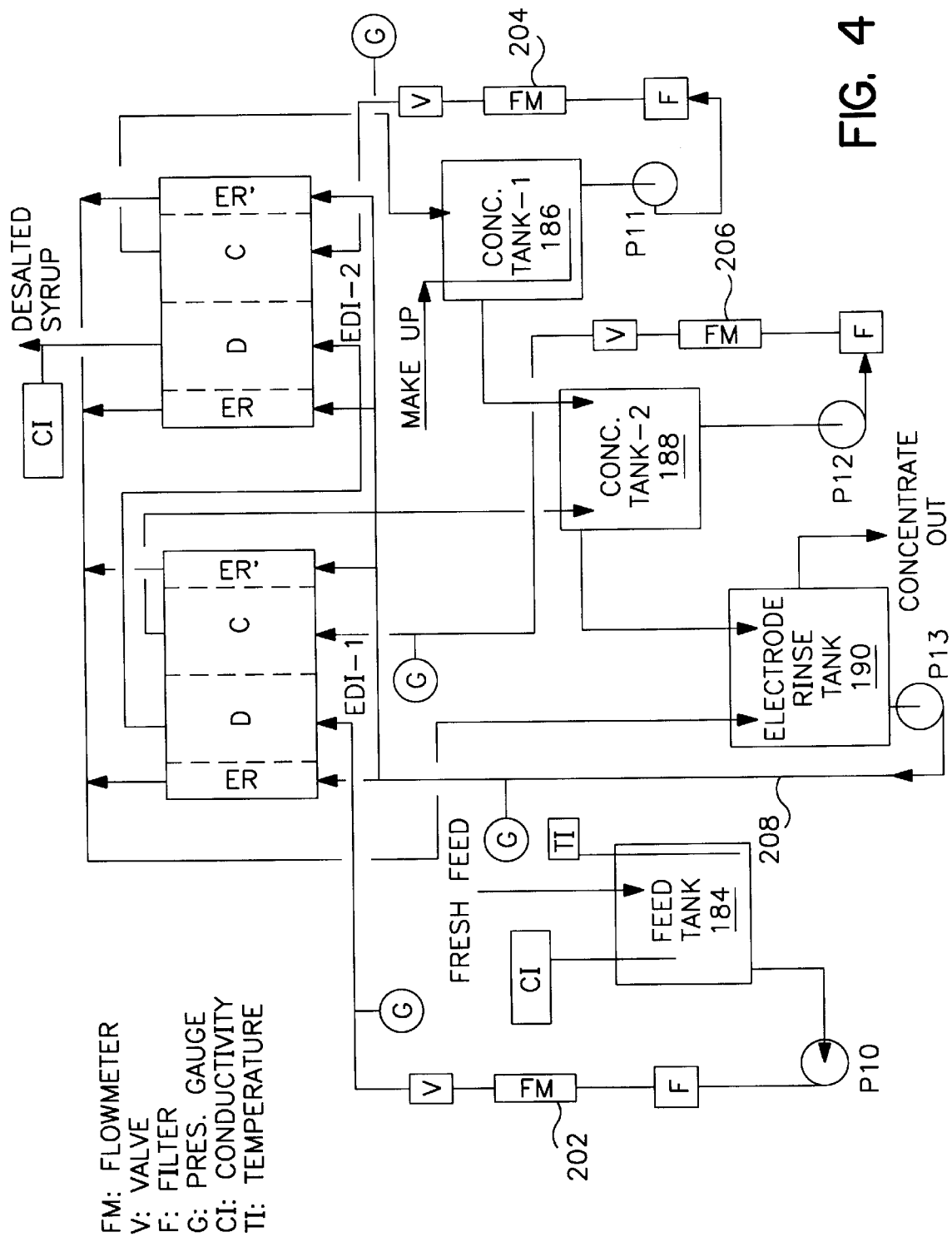
FIG. 4 schematically shows the pilot set up for demonstrating the EDI process.

FIG. 4 shows the pilot test assembly used to test the inventive process. The pilot facility can accommodate a single ED or EDI stack or two EDI stacks in series, as here shown. Each of the stacks, EDI-1 or EDI-2, contains eight cell pairs. This use of two EDI stacks in series provides a longer path length for higher levels of desalination, as well as an increased process throughput. Each of the stacks is constructed of cation 166 and anion 168 membranes separated by the desalting (D) and concentrating (C) compartments (FIG. 1).

Via internal manifolds, the compartments are supplied with the appropriate solutions taken from their respective feed tanks 184, 186, 188, 190. The electrode rinse compartments, ER and ER' at the anode and cathode ends, are supplied with an electrode rinse stream from a common supply tank 190. The tank is preferably a separate tank which may receive material as an overflow from the concentrate tank, thus minimizing the introduction of oxidative byproducts arising from electrode reactions into the main part of the stack. Optionally the electrode rinse loops can be fed from the concentrate tank itself.

The assembled EDI stack or stacks are placed in the process assembly system comprising the three or four solution loops, namely a feed loop 202, concentrate loop 206, a second concentrate loop 204 (when two EDI stacks are deployed), and the electrode rinse loop 208. The solution to be desalted is in the feed tank 184. Pump P10 circulates this solution through the desalting compartments D of the stack (s) via filter F, a flow meter FM and a flow regulating valve V operating under control of or in conjunction with a pressure gauge G. Similar setups are used to supply solutions from the concentrate and electrode rinse tanks 186, 188, 190 through pumps P11, P12, P13, respectively. To simplify the drawing, bypass loops around the pumps are not shown.

The feed stream of the desalting loop 202 is operated on a once through basis. The other loops 204, 206, 208 are preferably run in a recirculating, feed and bleed mode. When the process is run with two EDI cells, the fluid flow arrangement is preferably as shown in FIG. 4. The more highly desalted feed is in EDI-2 in conjunction with the less concentrated product from the tank 186. In effect, the flows in the dilute and concentrate loops are counter-current. This feature reduces the concentration gradient between the two loops, thereby facilitating the production of a more highly desalted product.

The two EDI stacks were electrically connected in parallel for the experimental studies. In this mode, both stacks operate at the same voltage from a single power supply, but at different current levels. (Other modes of operation can be used in commercial operation, if desired.) During the operation, the flow rate in the feed loop 202 is regulated to obtain a target level of desalination. The pressure gauges G and the regulating valves V adjust the flow rates in the other three loops 204, 206, 208 in order to obtain similar or slightly lower pressures at the inlets of the cell stacks.

Under a direct current driving force, the ions in the feed are transported to the concentrate loop. These ions, along with any water transport (e.g., from electro-osmotic transport), accumulate in the concentrate loop. Make up liquid (water or a portion of the feed itself) is added to the concentrate loop to maintain the concentration of acid and salts at certain target levels in order to achieve the optimum combination of desalting level, high product recovery ratio (the fraction of the product recovered relative to the total amount used in the desalting process) and process economics. In a continuous process, the concentrate overflows from the concentrate loop under a level control.

By varying the production rate and current throughput, a desalted product at a conductivity of 1–10 $\mu$S/cm can be directly produced via the EDI process. Alternatively, a product of slightly less purity (i.e. higher conductivity) may be produced by the EDI process and ion exchange columns used downstream to remove the residual ions.

The concentrate from the EDI process may be either discarded after a suitable neutralization or forwarded to a downstream application, such as ethanol production, which can utilize the sugar values contained, therein, or further processed in a variety of ways. In HFCS desalting, for example, the concentrate will have essentially all of the magnesium from the feed stream and small quantities of sugars. If recovered, the magnesium and sugars can be recycled to the front end of the process, thereby providing additional cost savings.

A number of process options have been devised for processing the concentrate:

Nanofiltration: This is a membrane based process that uses nanofiltration membranes. The process, which operates under a low pressure gradient of 50–200 psi, is able to separate the salts of multivalent ions and sugars from the salts of monovalent ions. In HFCS processing, for example, the magnesium salt will be substantially retained in the concentrate loop, along with any sugars, so that the stream can be recycled upstream.

Diffusion dialysis: This process uses highly diffusive anion exchange membranes that enables a selective recovery of the acidity in the concentrate stream. The process is driven by a concentration gradient between the feed stream and the product acid streams. Water is used to recover the transported acid. Salts as well as sugars are retained in the feed loop. The acid may be reused for acidifying the EDI feed solution.

pH adjustment/precipitation: Before or after the diffusion dialysis step, the concentrate waste from HFCS processing, is neutralized with an alkali such as sodium hydroxide/sodium carbonate in order to precipitate the magnesium values. The recovered magnesium is recycled to the upstream enzymatic conversion step:

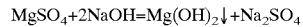

$$MgSO_4 + 2NaOH = Mg(OH)_2\downarrow + Na_2SO_4$$

Essentially, the filtrate from this operation will contain salts of monovalent cations, e.g., sodium chloride, sodium sulfate/sulfite. An additional ion exchange softening step may be required if the filtrate that is used produces an acid/base via a bipolar membrane based water splitting process (see below).

Membrane Water Splitting: If desired, the salt (e.g. sodium chloride, sodium sulfate/sulfite) separated from the multivalent cation impurities can be processed in a two or three compartment water splitter employing bipolar ion exchange membranes in conjunction with cation and/or anion selective membranes in order to generate the acid and base for reuse in upstream processes. The acid thus produced can be stored and used as needed; or, the stream that needs to be desalted can be directly acidified by circulating it through the acid loop of the water splitter to pick up the acid produced therein. The acidified feed is then forwarded to the EDI unit(s).

Electrodialysis: This process uses a combination of anion and cation selective membranes assembled between feed and concentrate compartments. In a preferred version of the process, monovalent selective cation membranes (such as the CMS cation membranes from Tokuyama Soda) are used.

Figure 5:
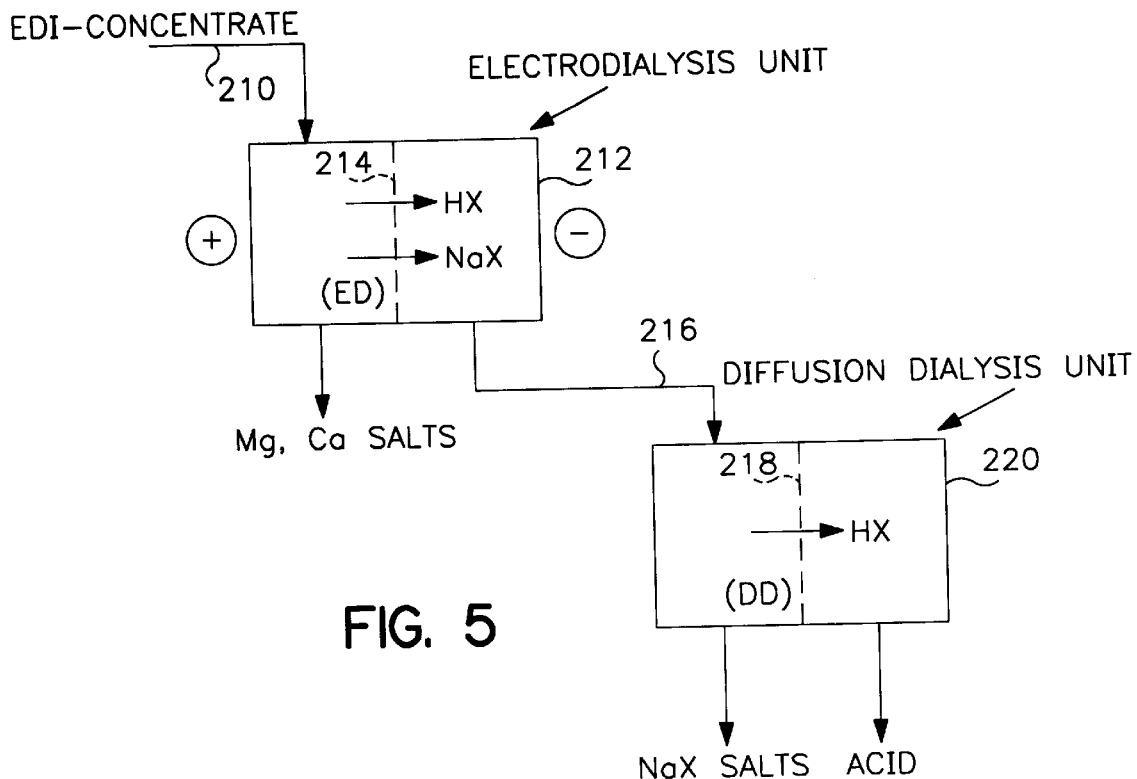
FIG. 5 is a process arrangement for recovering the acid from the concentrated waste water.

FIG. 5 illustrates the operation of a process using the concentrate from HFCS desalting. More particularly, FIG. 5 shows a concentrated incoming input feed stream 209 introduced into one electrodialysis unit (ED) via a pipe 210. The membrane 214 is a monovalent selective cation. The output of the unit 212 is delivered through a pipe 216 to the diffusion dialysis unit (DD) 220 containing an anion membrane 218 which separates salts from acid.

Under a direct current driving force using the ED unit, the monovalent selective cation membrane is able to transport the protons as well as the monovalent cations, such as sodium, while the anion membrane (not shown) transports the anions.

The net result is the separation of the acid and salts of monovalent cations from salts of the multivalent cations (Ca, Mg) in the ED unit. The recovered acid and monovalent salt mixture can be further processed via diffusion dialysis, if desired, to recover the acid. Therefore, by combining the above options, all of the components of the concentrate can be separated for possible reuse or selectively disposed as waste.

EXAMPLES

The viability of direct desalination of feed using EDI was tested by using an HFCS stream as the input feed stream. The composition of the stream was nominally as described earlier; however, wide variations in their salt and acid content were observed during long term tests. The pH of the feed solution acidified with sulfur dioxide was in the range of about 2–3.

The gaskets used in the processes of this invention had overall dimensions of 13"×13", a central, active area of 0.5 ft$^2$, and the layouts as shown in FIG. 2. Additional details about the gasket design and construction can be found in my co-pending application, Ser. No. 08/782,648. Commercially available ion exchange membranes from Ionics Inc. and Asahi Glass were used. The noble metal oxide coated anodes used in the EDI stacks were obtained from Electrode Products Inc. The cation and anion exchange resins were acquired from Rohm and Haas.

Comparative Example A

The desalting of HFCS syrup was carried out in a conventional electrodialysis (ED) cell using sixteen cell pairs.

The cell was constructed by using the gaskets shown in FIG. 2(a). The overall thickness of each of the gaskets was 1 mm (40 mils), comprising a 30 mil polyethylene sheet to which 5 mil thick Kraton® rubber sheeting was glued on each side. AMT anion membranes and CMT cation membranes, both from Asahi Glass Co., were used in assembling the ED stack, then the assembled stack was inserted into the test set up shown in FIG. 4. Next, 98 liters of the HFCS solution (440 $\mu$S/cm conductivity) was placed in the feed tank 184.

The feed syrup contained ~21 wt % fructose, 29 wt % dextrose, 246 ppm Na, 3 ppm Ca, 49.5 ppm Mg, and had a pH of 2.74. About ~5 liters of the same solution was placed in the concentrate tank 188. The electrode rinse tank 190 contained ~5 liters of dilute sodium sulfate solution (2.7 mS/cm conductivity). A DC power supply was connected to the anode and cathode terminals of the assembled ED stack. All of the fluid loops were operated in a batch mode, with the output from the dilute loop of the ED unit returned back to the tank 184.0 With the pumps P10, P12, P13 turned on and the inlet pressures adjusted to ~5 psi, each of the circulating loops had a flow of ~1.25 gal/min; representing a linear velocity of ~7 cm/sec. The process was run at temperature of 36° C.

The electrical power was turned on and the voltage set at 36 volts (~2 V/cell, allowing about 4 V for electrode rinse loops). As desalting progressed, the conductivity in the feed loop decreased while the conductivity of the concentrate loop increased. When the conductivity of the concentrate loop reached ~5 mS/cm, after about 4 hours into the run, the concentrate tank 188 was emptied and a 5 liter supply of fresh syrup solution was added. Reducing the salinity of the concentrate loop by this procedure allowed a further desalting of the syrup in the feed tank.

At the end of the test, ~97 liters of product syrup was obtained, containing: 0.32 ppm Na; 0.01 ppm Mg; and a non-detectable level of Ca. About 21 hours of run time was needed to reach the target levels of 98–99% desalination. The product syrup had a pH of ~4.0 and a conductivity of ~6 $\mu$S/cm.

These results show that it is possible to obtain a highly desalted syrup via the ED route. However, a key problem is that as the desalination progressed, a poor electrical conductivity of the syrup results in a considerable decrease in current throughput. For example, toward the end of the batch, the current throughput had decreased to <0.1 A. Consequently, the ED process has a low desalting capacity per square foot of membrane area. In this example, 9.7 ml/min of syrup is desalted per square foot of membrane area.

Comparative Example B

An EDI stack comprising 8 cell pairs was assembled and tested as a single stage in the set up shown in FIG. 4. Once again, the concentrate tank 186 and the associated circulating loop 204 were not used in the test. As described earlier, the feed compartment gaskets were ~2.5 mm thick and fabricated from 90 mil polyethylene sheet having 5 mil thick Kraton rubber sheets glued to each side. The concentrate compartment gaskets were recycled from the above example, as were the ion exchange membranes.

The feed compartments were filled with a mixture of Ambersep® 132 cation exchange and 440 anion exchange resins from Rohm and Haas. The assembled cell was placed in the pilot system shown in FIG. 4. An HFCS solution (~350 $\mu$S/cm conductivity) containing ~21 wt % fructose; ~29 wt % dextrose; 201 ppm Na; 42.5 ppm Mg; and a pH of ~2.7 was placed into the feed tank 184. Next, ~5 liters of the same solution was placed in the concentrate tank 188. The electrode rinse tank 190 contained ~5 liters of dilute sodium sulfate solution (~2 mS/cm conductivity). A DC power supply was connected to the anode and cathode terminals of the assembled EDI stack.

The feed loop containing the ion exchange resins exhibited a higher pressure drop than in the conventional ED cell, and was operated on a once through basis. The concentrate and electrode rinse loops were operated in the batch mode. The concentrate loop conductivity was maintained in the <5 mS/cm range by withdrawing the concentrated product and replenishing the loop with fresh syrup solution, as needed. When the pumps P10, P12, P13 were turned on and the pressures adjusted to 5.5–6.5 psi, the flow rates in the feed, concentrate, and electrode rinse loops were, respectively, 160–180 ml/min; 1.7 gal/min; and 0.5 gal/min. The process was run at a temperature of ~33–36° C.

Figure 6:
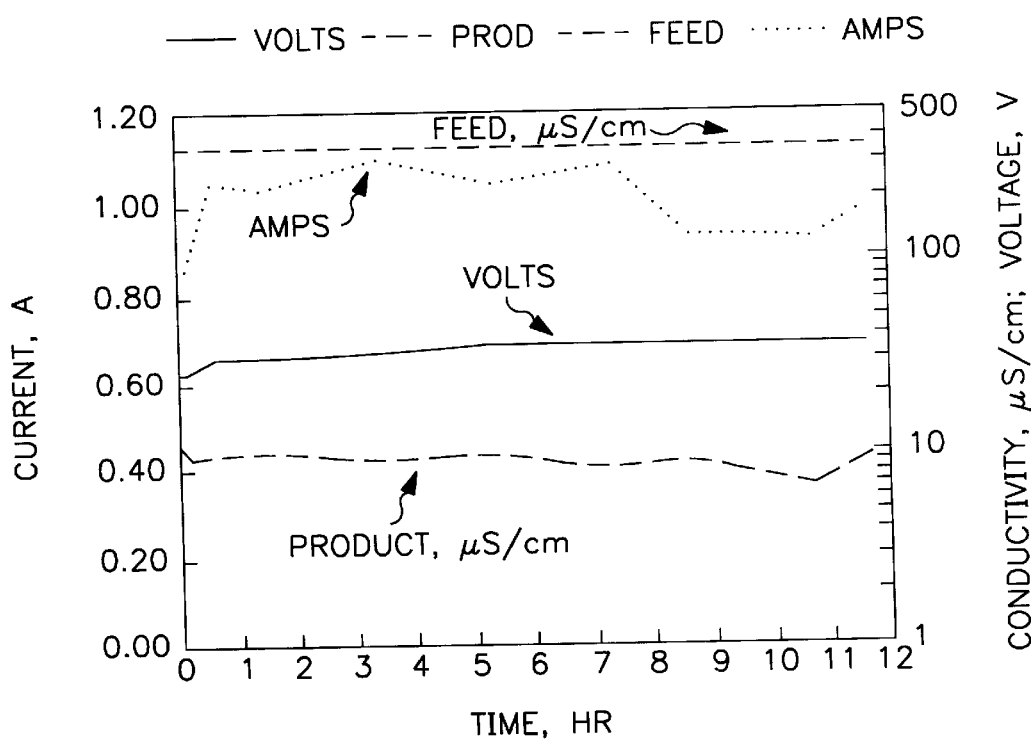
FIGS. 6, 6(a) and 7(a) and (b) are self explanatory graphs showing the relationship between the current, time (hours or days), and flow rate or ion removal.

The DC power supply was turned on and the voltage was maintained in the range of 22 to 36 volts. Within 10 minutes after the start up, the product conductivity stabilized at 7–11 $\mu$S/cm. The test was conduced for a period of ~10.5 hours. Product throughput and its conductivity remained stable for the entire test period, as can be seen in FIG. 6. Current throughput was in the range of 0.9–1.1 Amps. The product syrup pH remained stable at ~3.9. An analyses showed that sodium, calcium, and magnesium levels were essentially non-detectable in the product syrup samples. The production of desalted syrup was calculated at 40–45 ml/min per square foot of membrane area.

By comparing the Comparative Examples A and B, one can see that the EDI process has about 4–4.5 times the productivity of conventional electrodialysis. The product analyses demonstrated that the removal of magnesium in the EDI process using the acidified feed proceeded in substantial conjunction with the removal of sodium and hydrogen ions. The steady current throughput in the EDI process and the maintenance of high product purity indicated that the membranes and ion exchange resins were not being fouled by the hardness in the feed.

Example 1

A two stage EDI cell test was carried out using the HFCS feed solution. The construction of the cell stacks was similar to that used in the Comparative Example B and the assembled cells installed into the set up shown in FIG. 4. The EDI-1 used the AMT and CMT membranes and the IR122+IRA 402 resin mix in the ion depletion compartments. The EDI-2 used the AR 103A and CR63-LMP membranes from Ionics and the Ambersep 132+440 resin mix. The feed solution was once again run on a once through basis from EDI-1 to EDI-2; while the concentrate loops were run in a feed and bleed mode with the output from the second state (EDI-2) overflowing to the concentrate loop supplying EDI-1, as shown. The internal cell arrangement was such that the electrode rinse loops for the two EDI stacks were supplied from their respective concentrate loops. The two EDI stacks were electrically connected in parallel, powered by a single DC power supply operating at a set voltage.

A feed HFCS solution, at a conductivity of ~350 $\mu$S/cm, was supplied to the EDI units from the feed tank 184 at a rate of 340 to 380 ml/min. The same syrup solution was used to pick up the ions transported into the concentrate loop. The conductivity in the second state concentrate loop (Concentrate tank-1 or 186) was maintained at 2–2.5 mS/cm by periodic additions of feed syrup. The overflow from the concentrate loop of EDI-2 (Concentrate tank-2 or 188) had a conductivity of less than 5.5 mS/cm.

Figure 6A:
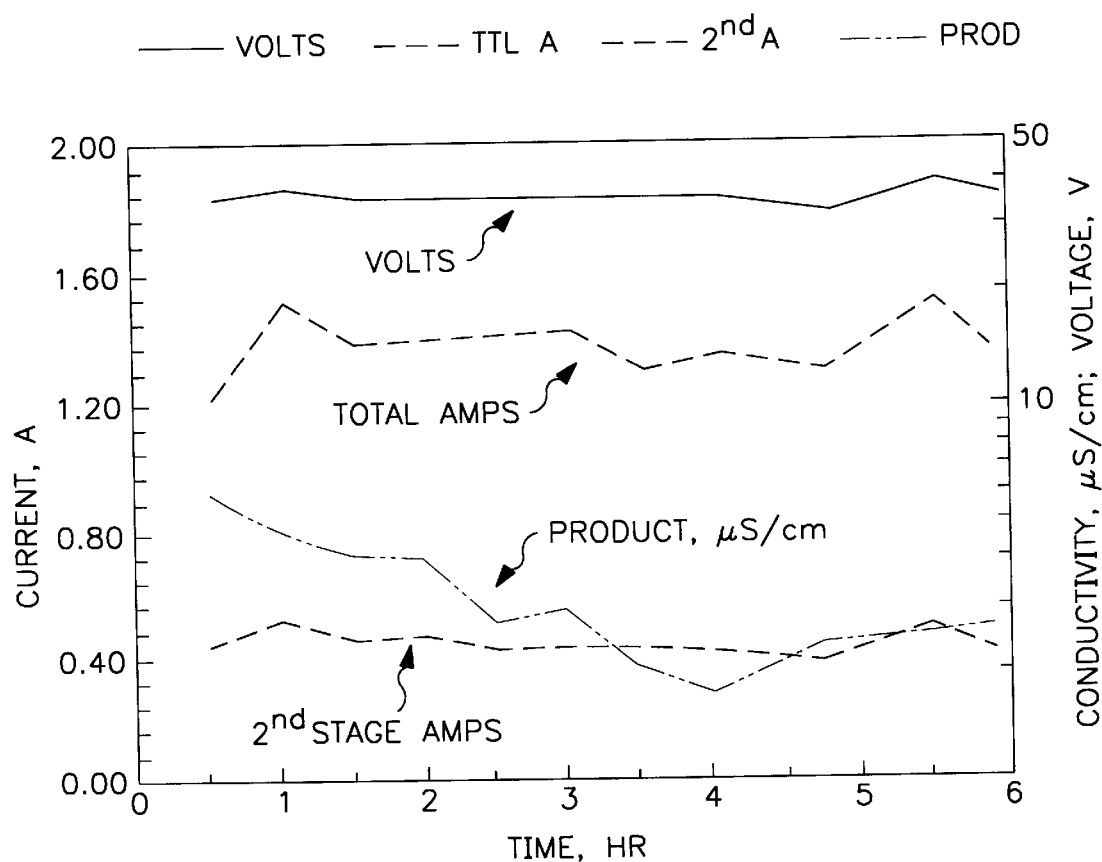

FIG. 6(a) shows the results from a 6 hours trial. As with the Comparative Example B, the current input to the cell stacks remained relatively steady, once again demonstrating that acidifying the feed enables the desalting process to occur in a trouble-free manner. The conductivity of the desalted syrup product was below 3 $\mu$S/cm after the first two hours or so, the overall desalting level being >99%. An analysis of the product syrup showed that it had essentially no detectable levels of ions and a pH of ~4.7. The concentrate waste from the trial had a pH of 2–2.5. The dextrose and fructose levels in the feed and product were essentially the same, thereby demonstrating the ability of EDI to achieve the target levels of desalination without causing dilution of the product syrup. Upon comparing the present Example with the Comparative Example B, it can be seen that the productivity of the EDI units is essentially the same, at ~45 ml/min per square foot of membrane area. However, the two stage process yielded a product of higher purity, because a longer path length was available, and perhaps because of the lower concentrate conductivity in the second stage EDI-2 (lower concentration gradient across the membranes).

Current-voltage measurements were carried out on the EDI stack using an aqueous solution at a conductivity of ~3 $\mu$S/cm in the ion depletion compartment. The plot of current versus voltage was essentially linear, showing that the EDI process operates in the non-water splitting regime (Regime I) even when the feed conductivity is as low as 2–3 $\mu$S/cm. As seen from the above examples the desalted feed at such a conductivity contains no detectable levels of calcium or magnesium, i.e., it is fully softened. Consequently, such a solution can be safely processed in another EDI unit operating in the water splitting regime (Regime II) to achieve conductivity levels of <0.1 $\mu$S/cm. Alternatively, one can combine the EDI stacks into a single one with a longer path length and achieve the same end result.

Example 2

A new EDI stack containing 8 cell pairs was assembled using CMT cation membranes from Asahi Glass and AR204 anion membranes from Ionics. An ion exchange resin mixture comprising IR 122 strong acid cation exchange resin and IRA 402 strong base anion exchange resin was used to fill the dilute (feed) compartments.

The cell assembly differed slightly from that shown in FIG. 3. There was a concentrate compartment next to the anode rinse compartment and a dilute compartment next to the cathode rinse compartment. The assembled cell was placed in the test assembly shown in FIG. 4. A long term test was carried out. Concentrate tank 186 and the loop 204 were not used.

An HFCS solution was added into the feed tank 184, as needed. The concentrate tank 186 was initially filled with water containing a small amount of sodium chloride. The electrode rinse tank 190 was filled with water to which a small amount of sulfuric acid had been added. Make up water was added to the concentrate tank 188 at a rate of ~30 ml/min and the overflow was sent to drain. The anode and cathode terminals were connected to a DC power supply.

The feed loop was operated on a once through basis with a production rate in the range of 270–360 ml/min. Each of the concentrate and the rinse loops had recycle rates of 0.4–0.6 gal/min and was operated in a feed and bleed mode. As the desalination of the feed occurred, the salts built up in the concentrate loop overflowed out of the loop. The cell operated at ambient temperature of 36° C.

The test was run for 83 days, with the applied voltage being held steady at 36 volts. The feed conductivity varied in the range of 200 to 450 $\mu$S/cm, while the product conductivity was typically 60–80 $\mu$S/cm, representing 70% desalination of the feed. The current throughput, which was initially 1.8–2 Amps, decreased to 1 Amps after 20 days and then remained relatively steady until Day 67.

An analysis of the desalted syrup on Day 33 showed 73% removal of sodium and 69% removal of magnesium. The desalted syrup, was produced at a rate of 280 ml/min and had 256 gm/l of fructose and 312 gm/l dextrose, vs. 278 gm/l and 319 gm/l, respectively, in the feed, indicating a negligible loss/dilution of the syrup feed. This was further confirmed by an analysis of the concentrate overflow which was ~23 ml/min of the concentrate product containing ~4 gm/l each of fructose and dextrose. The out flow represents a loss of <0.2 wt % of the sugars in the feed. The dilute loop of the EDI cell was cleaned out with a dilute NaCl solution on Day 55.

After Day 67, a progressive decrease in the electrode rinse flow as well as current throughput was observed. After Day 83, the test was stopped because the electrode rinse compartments in the EDI cell had become plugged with bacterial growth. Nevertheless, the relatively stable long term operation of the EDI cell demonstrates the improved process.

Example 3

The dilute loop of the EDI cell from the above test was rinsed with a mixture of 5 wt % sodium chloride containing 1–2 wt % caustic soda in order to clean out the ion exchange resins therein. The rinse solution was yellow, indicating the presence of sulfur compounds or organic residues on the ion exchange resins/membranes. The cell was opened and the bacterial growth products in the electrode rinse compartments were cleaned out manually.

The cell was then modified by adding an additional concentrate compartment and a CR64LMP cation exchange membranes (from Ionics) at both the cathode and anode ends. The cell assembly was then exactly as shown in FIG. 3.

A second EDI cell was assembled in a manner identical to the assembly of above cell. The two cells were installed in the pilot test facility as shown in FIG. 4. The second cell was installed as the EDI-2. Fresh HFCS solution was fed to the feed tank 184, as needed. Concentrate tanks 186, 188 and the electrode rinse tank 190 were initially filled with water containing a small amount of sodium chloride. Make up water was added at a rate of ~30 ml/min to tank 186. The concentrate output from tank 186 overflowed into tank 188 and from there partially to the electrode rinse tank 190. The concentrate overflow from tanks 188, 190 were sent to waste.

It was anticipated that the acidity and the higher ionic strength of the concentrate product circulating in the electrode rinse loops would eliminate the bacterial growth problem experienced in the earlier example. The anode and cathode terminals of the two EDI cells were connected in parallel to a single power supply, so that each cell would operate at the same potential drop.

In the process, the feed loop was operated on a once through basis with a production rate in the range of 270–420 ml/min. Therefore, the feed stream was passed first through the dilute loop of EDI-1, then through the dilute loop of EDI-2, and finally removed as the desalted product. Each of the concentrate and the rinse loops had recycle rates of 0.4–0.6 gal/min and was operated in a feed and bleed mode. As the desalination of the feed occurred, the salts built up in the concentrate loop and overflowed sequentially from tank 186 to tank 188, then (partially) to tank 190, and then out of the processing system. The cells operated at ambient temperature of ~36° C.

Figure 7A:
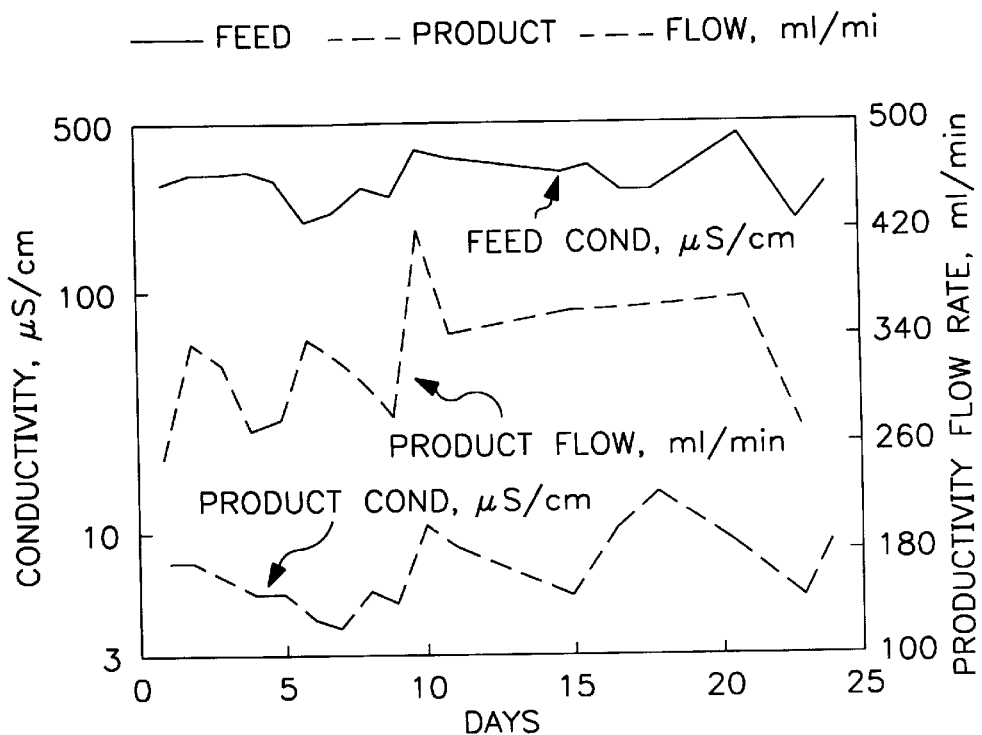
Figure 7B:
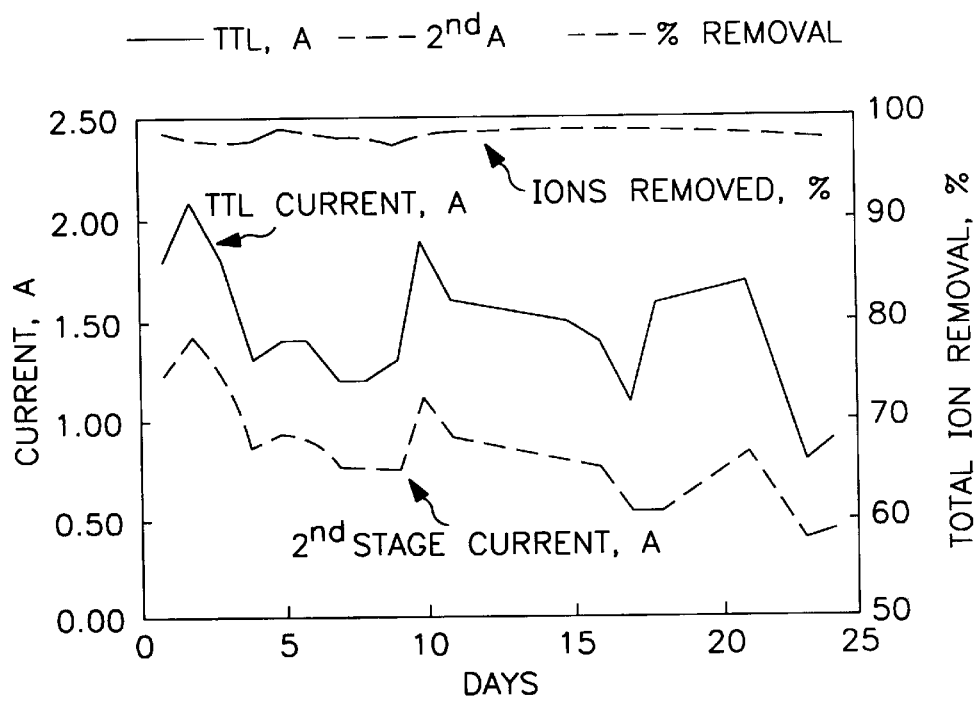

FIG. 7 is a graph showing the results from 24 days of operation. The applied voltage was held at a steady 30 volts. The feed conductivity varied in the range of 200 to 380 $\mu$S/cm, while the product conductivity was in the range of 4–11 $\mu$S/cm; representing 98–99+% desalination of the feed. The total current throughput varied during the trial, depending on the feed conductivity and temperature. The cells' performance was substantially steady, as measured by production rate and the extent of desalting.

An analysis of the desalted syrup on Day 21 showed 98% removal of sodium; 98.7% removal of magnesium; and 100% removal of calcium. The desalted syrup, produced at a rate of 370 ml/min had 242 gm/l of fructose and 290 gm/l dextrose, vs. 239 gm/l and 286 gm/l respectively in the feed. Within experimental error, these results indicated, a negligible loss/dilution of the syrup feed. This was further confirmed by an analysis of the concentrate overflow: ~22 ml/min of concentrate product containing ~15 gm/L each of fructose and dextrose. These analysis results represent a loss of <0.4 wt % of the sugars in the feed. The product syrup had a pH of 4.08, while the concentrate waste had a pH of 1.86.

Example 4

The EDI test was continued for a total of 60 days. The product flow rate was maintained steady at 280–400 ml/min. The flow rates through the concentrate and electrode rinse loops remained stable, indicating that the loops were not being plugged with precipitates, bacterial growth, etc.

However, it was noticed that the product conductivity had increased to 16.3 $\mu$S/cm after 25 days, indicating a decreased level of desalination. A fouling of the ion exchange resins was suspected. Therefore, the dilute loop of the cells were cleaned via a four step procedure: (a) circulating a mixture of ~8 wt % NaCl+1–2 wt % NaOH for ~1.5 hr.; (b) rinse with water; (c) circulate a mixture of ~8 wt % NaCl+1–2 wt % HCl for ~1 hr.; and (d) a final water rinse. The EDI process was then restarted. It was found that the product conductivity had stabilized at the 10–20 $\mu$S/cm range.

Samples of the wash solutions from Day 48 were analyzed for metals. The EDI cells had earlier operated continuously for 15 days. The results were as follows:

TABLE A

All of the metal concentrations are expressed in parts per million.

|  | Ca | Mg | Fe | K | S |
| --- | --- | --- | --- | --- | --- |
| NaOH wash | 67 | 926 | 8 | 226 | 10100 |
| HCl wash | 31 | 286 | 15 | 293 | 208 |

The low levels of calcium, and magnesium in the wash indicates that the resins or membranes are not being fouled by these ions. The predominant fouling species in the ion exchange resins (suspected to be on the anion exchange resin) is sulfur, possibly arising via a bio-catalyzed reducing reaction to $H_2S$.

In any event, a periodic wash normally restores the cell performance to a satisfactory level. The wash with NaCl+NaOH is able to substantially completely remove the sulfur values on the resins, as evidenced by the low sulfur concentration in the subsequent wash with the NaCl+HCl solution.

During the continued EDI process trials, it was found that a periodic wash once every two weeks or so enabled the EDI process to operate with a 88–95% removal of the ions in the feed stream. The following Table B summarizes the EDI performance results for Days 36 and 52:

TABLE B

|  | Day 36 | | Day 52 | |
| --- | --- | --- | --- | --- |
|  | Concentration feed → product, ppm | % Reduction | Concentration feed → product, ppm | % Reduction |
| Sodium | 180 → 16 | 91 | 153 → 13 | 91 |
| Magnesium | 28 → 2.4 | 91 | 32 → 1.5 | 95 |
| Chloride | 188 → 0 | 100 | 137 → 0 | 100 |
| Sulfur | 227 → 31 | 87 | 191 → 17 | 91 |

In a commercial process, the residual ions in the EDI product can be removed by a relatively small downstream ion exchange step.

Other process/equipment options that could improve the long term performance of the EDI in this application are:
Sterilization of the feed at the inlet to the EDI process, e.g. via an ultraviolet light treatment.
Use of a less fouling prone anion resin, such as the Type II strong base, the acrylic strong base, or a weak base resin and/or less fouling prone anion exchange membrane. For example, a separate long term trial using an ion exchange resin mix containing the IRA 410 anion resin, (a Type II resin), indicated that this resin was more thoroughly regenerated via a wash with a solution containing NaCl and NaOH, which proved to be better than the strong base anion resin used in the above examples.

Using a different acid such as hydrochloric or sulfuric for acidification of the EDI feed.

Example 5

A sample of the concentrate waste from the two stage EDI test was processed via nanofiltration. The membrane module in the filtration study was Model 5-DK, made by Desalination Systems. Approximately 10 gallons of the concentrate was processed, resulting in 7.5 gallons of permeate (i.e. filtrate) and 2.5 gallons of concentrate, representing a four fold concentration increase for the impermeable components. The results were as shown in the following Table C:

TABLE C

|  | Dextrose gm/l | Fructose g/l | Na ppm | Ca ppm | Mg ppm | Cl ppm | S ppm |
|---|---|---|---|---|---|---|---|
| Feed | 1.52 | 1.86 | 4010 | 44 | 777 | 4770 | 2791 |
| Permeate | — | — | 2585 | 1.56 | 19.2 | 3670 | 496 |
| Concentrate | 6.34 | 7.33 | 8300 | 215 | 4292 | 7250 | 10228 |

From the above results, one can calculate that >94% of the magnesium; ~93% of the calcium; ~90% of sulfur values (primarily sulfate, since there is very little sulfur dioxide in the concentrate waste because of its volatility); and substantially all of the sugars are retained in the concentrate.

Therefore, the use of sulfur dioxide for acidifying the EDI feed provides an advantage, because it is easily volatilized and removed in the acidic environment of the concentrate waste stream. The sulfur dioxide can be recovered and reused if desired. As a result, a separate acid removal step such as diffusion dialysis is not needed here. The permeate stream from nanofiltration may be discarded. Alternatively, it may be used as a source of salt for producing caustic soda and acid (primarily $HCl/H_2SO_4$)) via an electrodialysis water splitting process.

Figure 8:
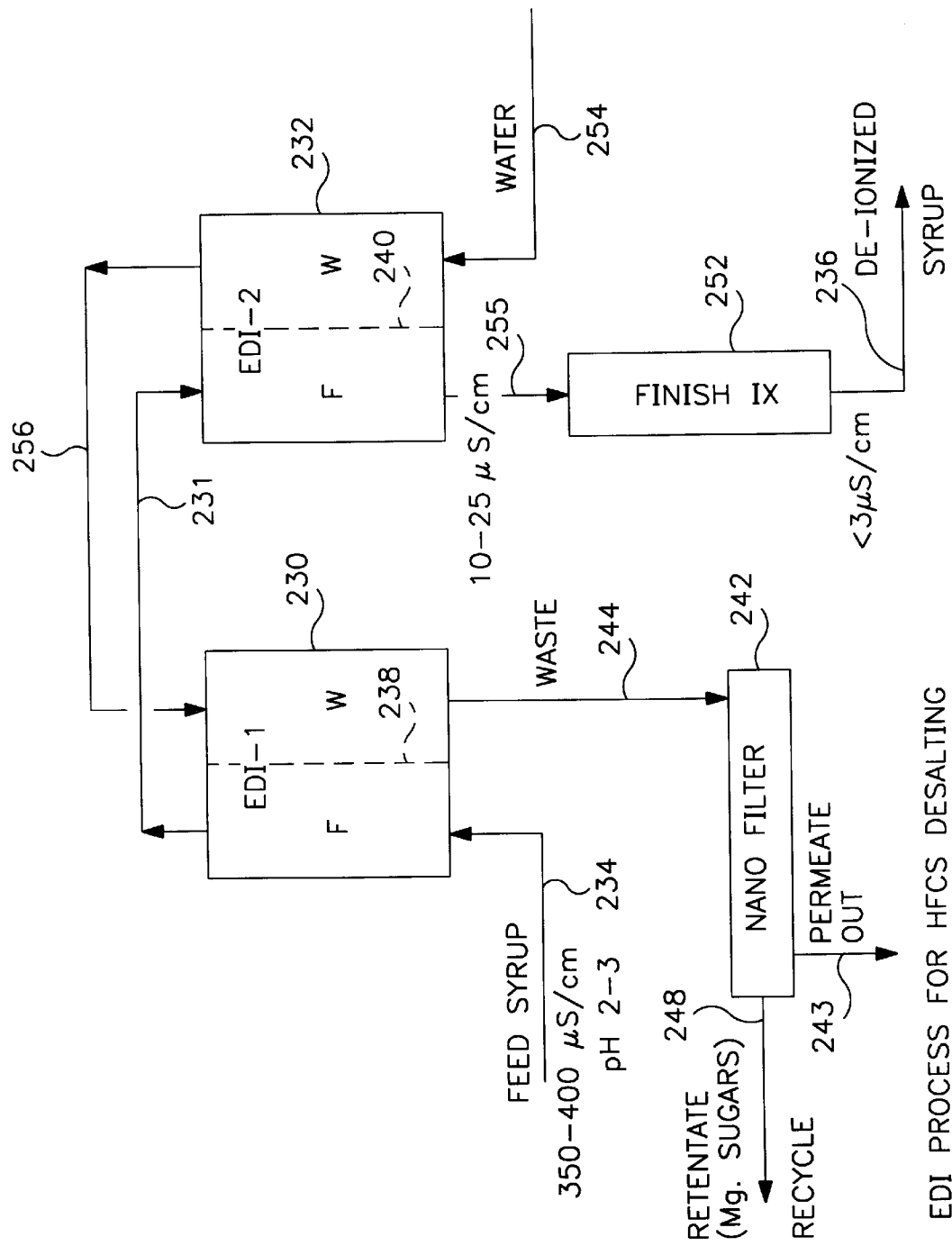
FIGS. 8 and 9 are process flow sheets for desalting sugar streams.
Figure 9:
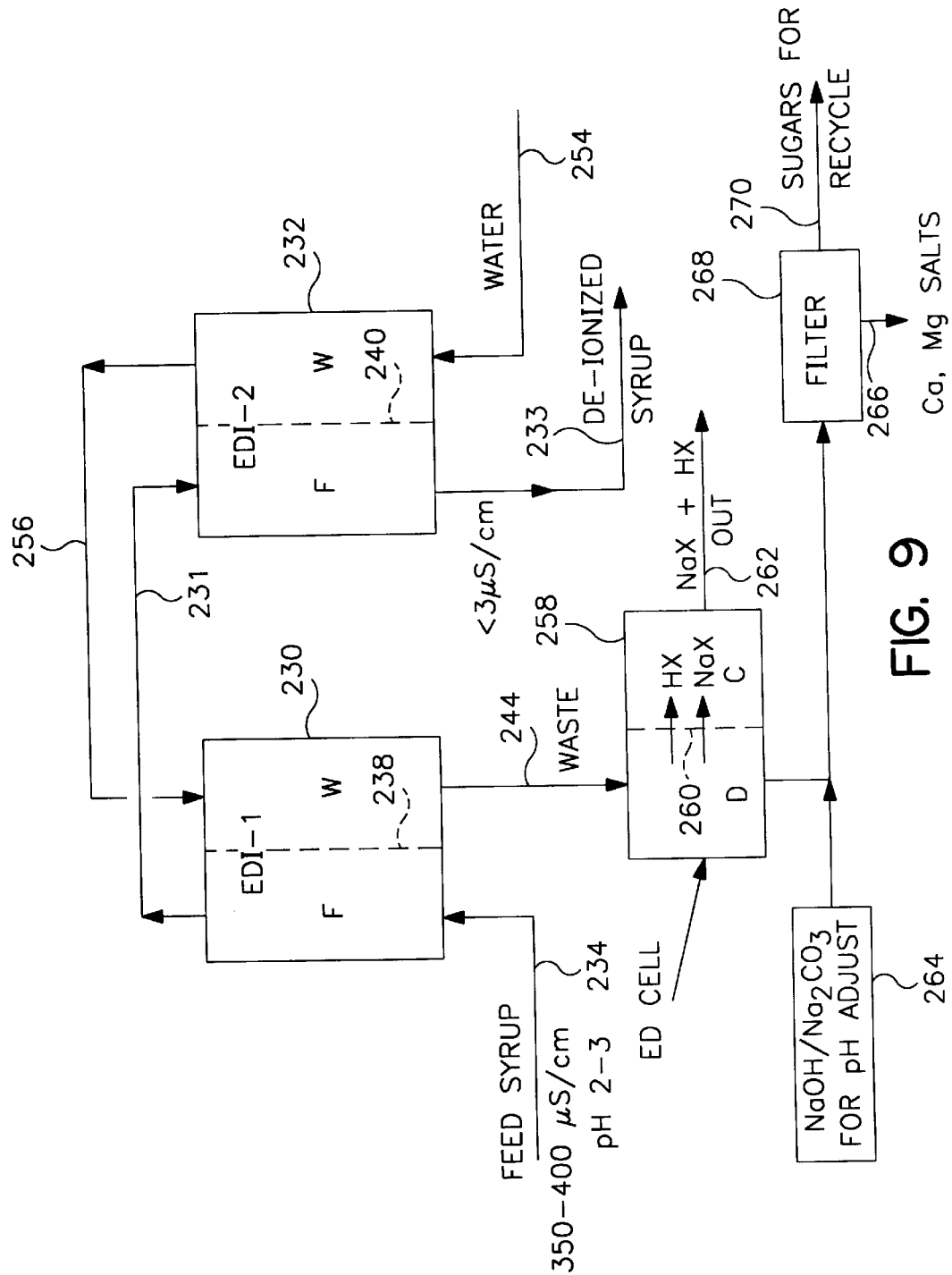

FIGS. 8 and 9 show some of the process arrangements for producing de-ionized solutions from acidified salt solutions. More particularly, FIG. 8 shows two EDI cells 230, 232 coupled in series, having an incoming feed stream 234 of a sugar syrup, and an out going stream of de-ionized syrup 236. Suitable membranes e.g., 238, 240 separate the cells 230, 232, respectively. The membranes separate the feed streams into the desired feed F and waste W. The waste from cell 230 is sent to a nanofilter 242 via a pipe 244. At 243, the permeate of the waste is sent to a drain or a secondary use. The retentate is recycled to the dextrose isomerization step via pipe 248.

The feed from the F side of cell 232 is sent to an ion exchange column 252 via pipe 255. Water is introduced into the waste side of cell 232 via a pipe 254 and forwarded to the waste side W of cell 230 via pipe 256 in order to obtain the concentrated waste.

FIG. 8 shows a process that is particularly applicable for HFCS desalting, since the magnesium values present in the concentrate are worth recovering along with any sugars that are present in the concentrated waste stream. In the process, the feed solution is processed in the EDI units 230, 232 to a suitably low salt content.

In the example shown, a value of 10–25 $\mu$S/cm has been assumed for the product syrup conductivity; however, depending on the type of feed, product flow rate, current input etc., higher or lower levels of desalination may be achieved. The partially desalted syrup from the EDI process may be subjected to a final ion exchange step, as shown, to achieve the product conductivity of <3 $\mu$S/cm. The ion exchange column 252 (or columns) used here may be either a single mixed bed type or a sequence of cation and anion exchange columns.

The concentrated waste from the EDI cells has a salt content that is 10–20 times more than is present in the HFCS feed. This waste is then subjected to a nanofiltration operation at 242, which separates, principally, the magnesium salts and sugars from the monovalent salts, and also concentrates them 4–5 fold. This feed stream can be returned to the fructose production step via pipe 248.

It is entirely feasible to obtain the desalted syrup at the target conductivity of <3 $\mu$S/cm by using only the EDI process as described in Example 1, so that an additional post treatment via an ion exchange is not needed.

FIG. 9 shows the use of EDI in the desalting of dextrose solutions. More particularly, EDI cells 230, 232 are coupled in series. Suitable membranes such as 238 and 240 in each cell separates a feed F from waste W. The incoming dextrose feed stream is fed through pipe 234 to the feed side F of the EDI-1 cell 230 and via pipe 231 onto the feed side F of the EDI-2 cell 232. The end product output stream appears at output 233. The waste is sent from the waste side W through a line 244 to the dilute side D of an ED cell 258 where membranes such as 260 separate the waste stream into a mixture of HX and NaX which is discharged via pipe 262. The feed which passes through the dilute side D is adjusted for its pH to about 9–10 using alkali from tank 264 and filtered to remove salts 266 at the filter 268 and the filtrate containing sugars returned for recycling at 270.

The impure dextrose obtained from the saccharification of starch has a variety of salts arising from the original source of the starch (e.g. corn). The principal cations are Ca, Mg, Na, and K, while the anions are principally chloride and sulfate. The impure dextrose solution typically has 50 w % dextrose and a conductivity of 350–500 $\mu$S/cm. The feed is acidified to a pH of ~3 prior to the carbon treatment and the desalting steps. Preferably, sulfur dioxide is used once again for acidification. After a carbon treatment, this feed stream (fed via pipe 234) is desalted via EDI to a final conductivity of <3 $\mu$S/cm.

The concentrate waste from the EDI cells may be either discharged after neutralization or forwarded to a downstream process that can utilize the relatively small amounts of sugars that are present therein. In the process shown in FIG. 9, the waste stream is passed through an electrodialysis unit which recovers a substantial amount (say 80–90%) of the free acid (Hx) as well as the salts of monovalent cations (NaX). The residual stream may then be pH adjusted to precipitate the salts of multivalent cations (Ca, Mg, Fe) and recycled to the upstream sugar recovery step. A nanofiltration unit may be used in place of the electrodialysis unit, if desired.

Figure 10:
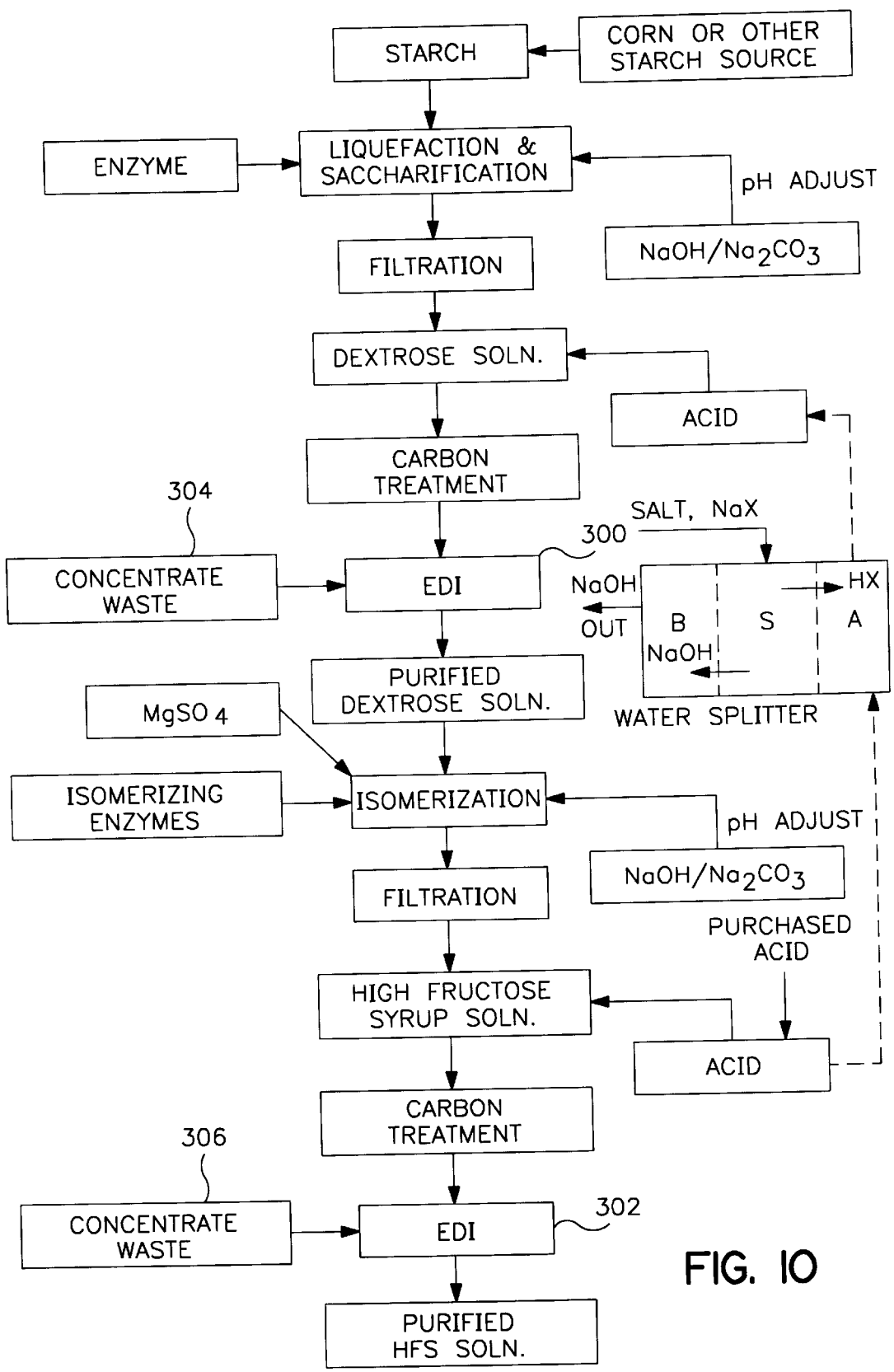
FIG. 10 is a flow chart showing the application of EDI in sugar production.

FIG. 10 shows the application of the inventive EDI process to produce dextrose and high fructose sugar (HFS) from the starch raw material. The integrated process uses two separate EDI steps 300, 302 to desalt the dextrose and HFS streams. By a use of methods described elsewhere, the concentrate waste streams 304, 306 may be processed to recover the magnesium and residual sugars as well as salts of monovalent cations (NaX). The sodium salt NaX may be used to generate the acid and base values for reuse in the process as shown, thereby substantially eliminating the production of waste salt streams.

Those who are skilled in the art will readily perceive how to modify the invention. Therefore, the appended claims are to be construed to cover all equivalent structures which fall within the true scope and spirit of the invention.

The claimed invention is:

1. A process for desalting aqueous salt solutions, said process comprising the steps of:
   a. providing an aqueous feed stream containing salts to be removed by a desalting process;
   b. providing at least one electrodeionization cell having at least a feed compartment and an adjacent concentration compartment, said feed compartment containing an ion exchange material and being isolated from the adjacent concentration compartments by an anion and a cation exchange membrane, said concentration compartment containing a turbulence promoter material;
   c. acidifying the feed stream to have a pH in a range of about 0–3;
   d. feeding the acidified feed stream of step c. to the feed compartment of the electrodeionization cell;
   e. supplying a liquid including water to the concentrate compartment;
   f. passing a DC current through the electrodeionization cell to effect a substantial desalination of the feed stream and to transport salts and acid to the concentration compartment; and
   g. withdrawing a less acidic desalted product and concentrate waste solutions from the feed and concentration compartments respectively of the electrodeionization cell.

2. The process of claim 1 wherein the stream in the concentrate compartment is maintained at a pH in the range of about 0–7.

3. The process of claim 1 wherein the desalination stream of step f. is at a pH of less than about 5.

4. The process of claim 1 wherein there are a plurality of said electrodeionization cells coupled in series, and the acidified feed stream of step c. is passed through said plurality of electrodeionization cells to effect greater levels of desalination in step f.

5. The process of claim 1 wherein the feed stream of step c is acidified with an acid selected from a group consisting of hydrochloric acid, sulfuric acid, and sulfur dioxide.

6. A process for desalting sugar containing solutions, said process comprising the steps of:
   a. providing at least one electrodionization cell having at least a feed compartment and an adjacent concentration compartment, said feed compartment containing an ion exchange material and being isolated from the adjacent concentration compartment by an anion membrane and a cation exchange membrane, said concentration compartment containing a turbulence promoter;
   b. providing a feed stream containing a sugar solution having unwanted salts therein;
   c. acidifying said feed stream of step b. to a pH in a range of about 0–3;
   d. feeding the acidified feed stream of step c. to the feed compartments of said electrodeionization cell;
   e. supplying a liquid including water to the concentration compartment;
   f. passing a DC current through the electrodeionization cell to effect a substantial desalination of the feed stream; and
   g. withdrawing a less acidic desalted solution and a concentrated waste solution containing salts and acid as well as any sugars transported out of the feed solution.

7. The process of claim 6 wherein the desalted stream of step g. has a pH in the range of less than about 5 and the contents of said concentration compartment is maintained at an acidic level.

8. The processes of either one of the claims 6 or 7 and a nanofilter, and the further step wherein a concentrate waste solution of step g. is processed via the nanofilter to isolate multivalent metals and sugars therein.

9. The process of claim 8 and the further steps of separating the multivalent metals and sugars that are recovered by a pH adjustment/filtration to remove the multivalent metals, and forwarding a resultant filtrate containing sugars for recovery.

10. The processes of either one of the claims 6 or 7 where the sugar solution of step b. is a high fructose syrup solution obtained by an enzymatic conversion of a dextrose solution.

11. The processes of either one of the claims 6 or 7 and the further step of providing the sugar solution as a concentrated dextrose solution obtained from a saccharification of a starch containing solution.

12. The process of claim 6 further comprising a carbon column, and the further step wherein the feed stream acidified in step c. is passed through said carbon column to remove fouling organic compounds and color bodies prior to the feed stream being fed to said electrodeionization cell in step d.

13. The process of either one of the claims 7 or 12 wherein the feed stream of step b. is acidified in step c. with an acid taken from a group consisting of hydrochloric acid, sulfuric acid, and sulfur dioxide.

14. The process of claim 6 further comprising providing a nanofilter; and the further step of processing the concentrate waste solution of step g. via said nanofilter to isolate salts of multivalent cations and sugars for recycling to the enzymatic conversion step.

15. The processes of either one of the claims 1 or 6 wherein the ion exchange material used in step a. is a mixture of cation and anion exchange resins.

16. The processes claim 15 wherein the anion exchange resin is selected from a group consisting of a resin I or II strong base resin, a weak base resin, or an acrylic resin.

17. The processes of either one of the claims 1 or 6 wherein the concentrate waste solution of step g. is processed via a further step comprising a diffusion dialysis in order to recover the acid.

18. The process of claim 6 wherein multivalent cations and sugars from step g. are isolated from acids and salts of monovalent cations via electrodialysis.

19. The processes of either one of the claims 1 or 6 and at least one ion exchange column containing cation or anion exchange resins capable of removing residual ions contained in said feed stream, and the step of further de-ionizing the desalted feed from the electrodeionization step g. by passing it through the ion exchange column.

20. The process of claim 19 wherein there are two of said columns coupled in series and respectively containing cation and anion exchange resins.

21. The process of claim 19 wherein said column contains a mixed bed containg both cation and anion exchange resins.

22. The process of claims 1 or 6 where two or more electrodeionization stacks are connected in series and the feed solution is desalted by flowing in series through said stacks.

23. A process comprising the steps of:
   a. electrodeionizing a feed stream of a high fructose sugar solution and desalting said feed stream;
   b. performing a nanofiltration of a concentrated waste for recovering magnesium and sugar values from said feed stream; and c. recycling said magnesium and sugar values to an upstream enzymatic conversion step for enabling a high fructose sugar production.

24. A process comprising the steps of:
a. electrodeionizing a feed stream of a solution containing a material selected from a group consisting essentially of dextrose or fructose, and desalting said feed stream;
b. performing an operation on a concentrated waste solution derived from step a. for recovering multivalent cations and sugars and for generating a waste stream; said operation being selected from a group consisting of a nanofiltration or electrodialysis;
c. pH adjusting the solution from step b. with an alkali to precipate and remove the multivalent cations; and
d. recycle sugar values resulting from step c to an upstream sugar production step.

25. The process of claim 24 wherein a concentrate waste solution derived from step a. or b is subjected to diffusion dialysis to recover acid values for reuse.

26. The process of claim 24 wherein a waste stream from step b. is subjected to diffusion dialysis to recover acid values for reuse.

* * * * *